(12) United States Patent
Gregg et al.

(10) Patent No.: US 7,980,839 B2
(45) Date of Patent: *Jul. 19, 2011

(54) PRODUCTION OF UHMWPE SHEET MATERIALS

(75) Inventors: Joseph V. Gregg, Ft. Wayne, IN (US);
Wesley Allen Kohler, Ossian, IN (US);
Lyle D. Berning, Monroeville, IN (US)

(73) Assignee: Quadrant EPP AG, Lenzburg (CH)

( * ) Notice: Subject to any disclaimer, the term of this patent is extended or adjusted under 35 U.S.C. 154(b) by 0 days.

This patent is subject to a terminal disclaimer.

(21) Appl. No.: 12/729,288

(22) Filed: Mar. 23, 2010

(65) Prior Publication Data

US 2010/0173030 A1    Jul. 8, 2010

Related U.S. Application Data

(60) Division of application No. 11/777,405, filed on Jul. 13, 2007, now Pat. No. 7,736,579, which is a continuation-in-part of application No. 11/491,416, filed on Jul. 21, 2006, now Pat. No. 7,758,796, and a continuation-in-part of application No. 11/491,356, filed on Jul. 21, 2006, now Pat. No. 7,758,797, and a continuation-in-part of application No. 11/491,361, filed on Jul. 21, 2006, now Pat. No. 7,803,450.

(51) Int. Cl.
*B29C 47/14* (2006.01)

(52) U.S. Cl. ........................................ 425/113; 425/115

(58) Field of Classification Search .................. 264/323; 425/113, 115

See application file for complete search history.

(56) References Cited

U.S. PATENT DOCUMENTS

| 1,902,953 A | 3/1933 | Eardley |
| 2,965,589 A | 12/1960 | Price |
| 3,382,535 A | 5/1968 | Ferrari |
| 3,384,925 A | 5/1968 | Rothemeyer |
| 3,492,310 A | 1/1970 | Carrow |
| 3,665,068 A | 5/1972 | Duling et al. |
| 3,695,575 A | 10/1972 | Hauser |
| 3,710,988 A | 1/1973 | Moslo |
| 3,804,567 A | 4/1974 | Recknagel |
| 3,883,631 A | 5/1975 | Murray |
| 3,887,319 A | 6/1975 | Cottingham |
| 4,008,035 A | 2/1977 | Korostoff et al. |
| 4,021,521 A | 5/1977 | Scholl et al. |
| 4,145,175 A | 3/1979 | Groff et al. |

(Continued)

FOREIGN PATENT DOCUMENTS

DE    4418527 A1    6/1995

(Continued)

OTHER PUBLICATIONS

Tarkow et al., Surface Densification of Wood, Forest Products Journal, 18(a): 104-107 vol. 18, No. 9, Sep. 1968.

(Continued)

*Primary Examiner* — Joseph S Del Sole
*Assistant Examiner* — Kimberly A Stewart
(74) *Attorney, Agent, or Firm* — Brooks Kushman P.C.

(57) ABSTRACT

Wide panels of UHMWPE having exceptional flatness and surface quality are ram extruded through a slit die equipped with a plurality of individually adjustable cooling zones proximate the panel exit slit and transverse to the machine direction, which cool the panel while the panel is restrained by a back pressure device and preferably a vertical movement restraint. The process is robust and can be run for long product campaigns.

35 Claims, 7 Drawing Sheets

U.S. PATENT DOCUMENTS

| | | |
|---|---|---|
| 4,182,606 A | 1/1980 | Gibbon |
| 4,238,538 A | 12/1980 | Manwiller |
| 4,240,997 A | 12/1980 | Jex |
| 4,368,022 A | 1/1983 | Orii |
| 4,781,554 A | 11/1988 | Hendry |
| 4,797,245 A | 1/1989 | Sonoda |
| 4,842,507 A | 6/1989 | Kawaguchi et al. |
| 4,846,614 A | 7/1989 | Steinbock |
| 4,874,657 A | 10/1989 | Lo et al. |
| 4,904,318 A | 2/1990 | Goto et al. |
| 4,933,393 A | 6/1990 | Toyota et al. |
| 4,938,908 A | 7/1990 | Shiraki et al. |
| 4,948,543 A | 8/1990 | Pawlowski et al. |
| 4,952,625 A | 8/1990 | Shiohara et al. |
| 5,068,073 A | 11/1991 | Pennings et al. |
| 5,083,889 A | 1/1992 | Steinbock |
| 5,089,200 A | 2/1992 | Chapman, Jr. et al. |
| 5,149,193 A | 9/1992 | Faillace |
| 5,156,790 A | 10/1992 | Cucchisi et al. |
| 5,234,652 A | 8/1993 | Woodhams et al. |
| 5,286,576 A | 2/1994 | Srail et al. |
| 5,399,308 A | 3/1995 | Woodhams et al. |
| 5,417,561 A | 5/1995 | Shiraki et al. |
| 5,422,061 A | 6/1995 | Takahashi et al. |
| 5,449,484 A | 9/1995 | Gusik et al. |
| 5,474,722 A | 12/1995 | Woodhams |
| 5,567,368 A | 10/1996 | Ando et al. |
| 5,874,034 A | 2/1999 | Proper et al. |
| 5,946,878 A | 9/1999 | Grund et al. |
| 6,013,217 A | 1/2000 | Hauenstein et al. |
| 6,103,305 A | 8/2000 | Friedmann et al. |
| 6,112,396 A | 9/2000 | Steinbock |
| 6,113,374 A | 9/2000 | Brackman et al. |
| 6,199,453 B1 | 3/2001 | Steinbock |
| 6,263,764 B1 | 7/2001 | Steinbock |
| 6,381,827 B1 | 5/2002 | Steinbock |
| 6,489,404 B2 | 12/2002 | Bolluijt et al. |
| 6,652,254 B2 | 11/2003 | Shimura et al. |
| 6,949,208 B1 | 9/2005 | Kawauchi et al. |
| 2004/0265407 A1 | 12/2004 | Prugh et al. |
| 2006/0079596 A1 | 4/2006 | Schroeder et al. |
| 2006/0258767 A1 | 11/2006 | Schroeder et al. |

FOREIGN PATENT DOCUMENTS

| | | |
|---|---|---|
| GB | 1479335 | 7/1977 |
| JP | 60101021 | 6/1985 |
| JP | 08224711 | 2/1995 |
| WO | 2006041969 A1 | 4/2006 |
| WO | 2008/009149 A1 | 1/2008 |
| WO | 2008/009150 A1 | 1/2008 |

OTHER PUBLICATIONS

Earl E. Day, "Continuous Extrusion of Recovered Ultra-High Molecular Weight Polyethylene," Chelsea Center for Recycling and Economic Development Technical Research Program, Jan. 2000, Technical Report #16, pp. 1-3, Jan. 2000.

ArCom Processed Polyethylene, "Resin and Consolidation Issues with UHMWPE". Biomet Inc., Form No. Y-BEM-069/093095/H, 1995.

English Abstract for DE 4418527, Jun. 29, 1995.

English Abstract for JP60101021, Jun. 5, 1985.

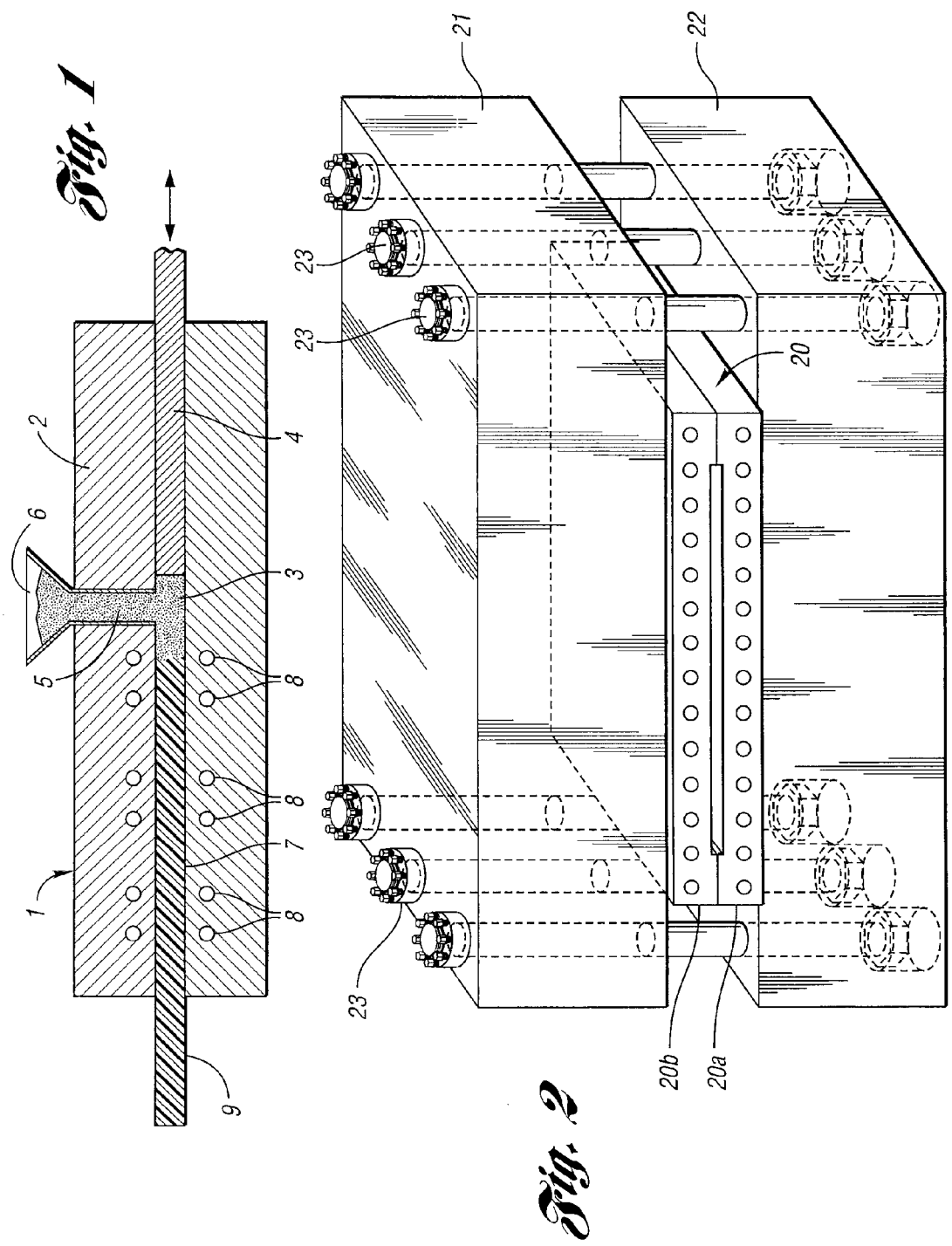

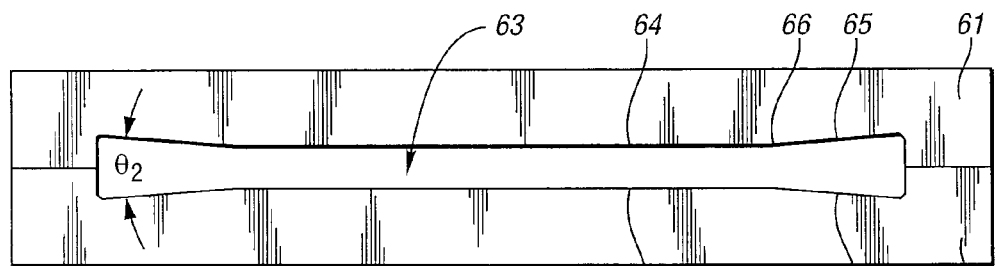
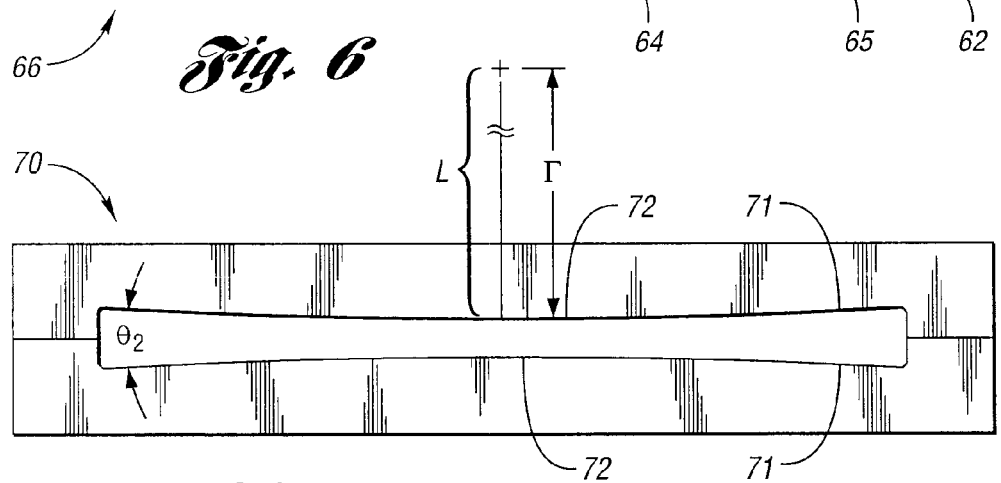
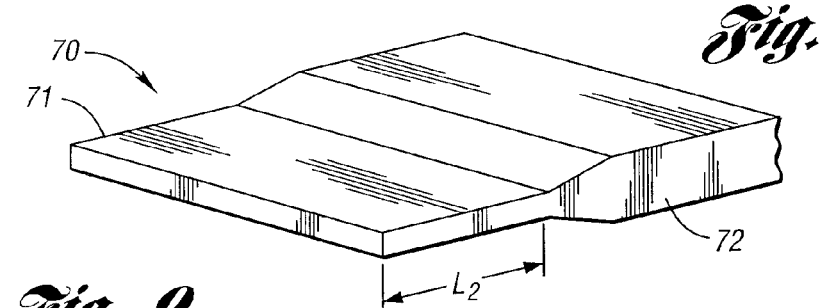
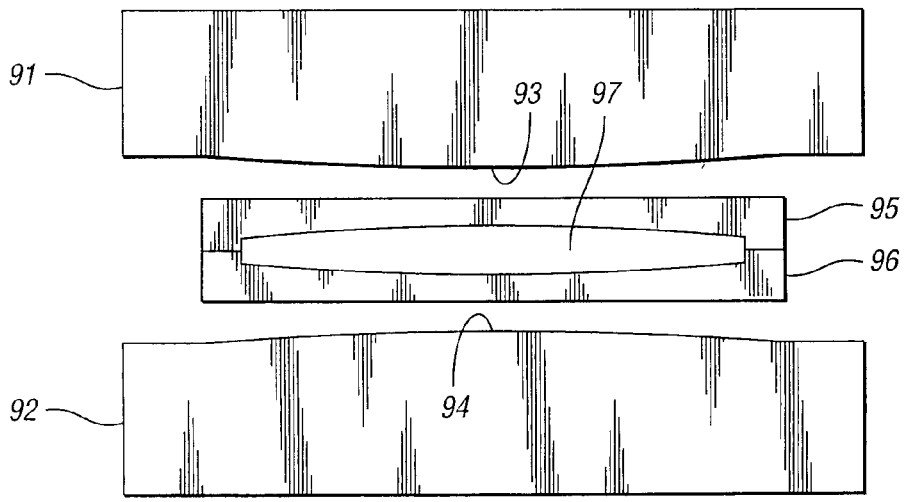

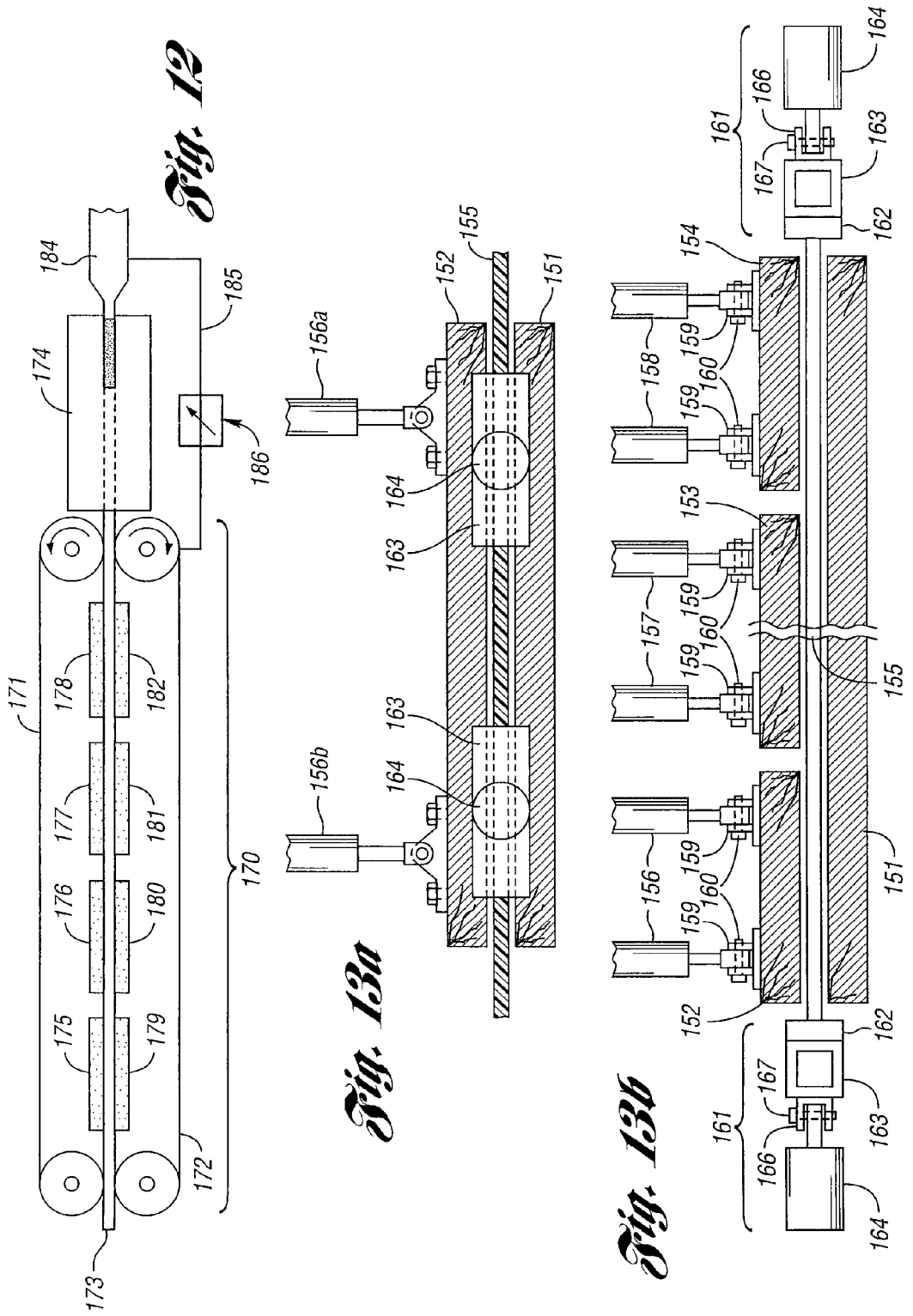

PRODUCTION OF UHMWPE SHEET MATERIALS

This application is a continuation-in-part of U.S. application Ser. No. 11/491,416 filed Jul. 21, 2006, U.S. application Ser. No. 11/491,356 filed Jul. 21, 2006, and U.S. application Ser. No. 11/491,361 filed Jul. 21, 2006, all pending, priority to all of which is hereby claimed.

BACKGROUND OF THE INVENTION

1. Field of the Invention

The present invention is directed to the production of sheets of ultra high molecular weight polyethylene in widths greater than about 40 cm, by ram extrusion, and to sheets produced thereby.

2. Background Art

Conventional polyethylene polymers with which many are familiar, i.e. low and high density polyethylene, are waxy solids not known for exceptional strength properties. Also, due to their relative softness, while generally lubricious, they are easily abraded. Ultra high molecular weight polyethylene, "UHMWPE", on the other hand, is an exceptionally strong and durable polymer totally unlike its poorer relatives.

UHMWPE is prepared by special polymerization processes in which the polyethylene chains acquire an exceptionally high molecular weight, typically having number average molecular weights of from $1.5 \times 10^6$ to $1 \times 10^7$ daltons, supplied as a resin powder. UHMWPE also includes those polymers defined in ASTM D4020-05; D6712-01; and ISO 11542-2. While generally homopolymeric in nature, UHMWPE also includes copolymers having limited amounts of other copolymerizable comonomers. In the case of copolymer UHMWPE, the aforementioned ASTM and ISO requirements should be met. It is their very long polymer chains which make these polymers unique. However, this same feature is also the cause of major processing problems. While ordinary polyethylene can be melt extruded, even polyethylene of very high molecular weight, attempts to melt extrude UHMWPE have been largely unsuccessful, despite much research in this area, and virtually all UHMWPE products are produced by compression molding or ram extrusion, as indicated by U.S. Pat. No. 5,286,576, which indicates that processing methods applicable to conventional thermoplastics, such as continuous extrusion, calendaring, and injection molding, are generally inapplicable to UHMWPE.

Thus, for example, U.S. Pat. No. 5,422,061 discloses the manufacture of sliding members by screw extrusion of UHMWPE from the melt. However, for the process to work, mixtures of UHMWPE, lower molecular weight polyethylene ("PE"), and lubricants must be employed. Considerable loss in mechanical properties thus results due to the dilution of the UHMWPE with lower molecular weight species. Further losses in properties are caused by shear degradation in the extruder.

U.S. Pat. No. 5,399,308 discloses melt extrusion through a die whose final cross-section is considerably reduced as compared with the diameter of the extruder, and wherein a very low elongational velocity gradient is maintained. However, despite these requirements, only very high molecular weight PE and UHMWPE in the lowest molecular weight range, about $1.5 \times 10^6$, are useful. U.S. Pat. No. 5,449,484 discloses a screw geometry for a single screw extruder said to be useable with PE resins having molecular weights greater than $1 \times 10^6$. However, large profiles cannot be made using such a melt extrusion process.

The problems associated with processing of UHMWPE are due in part to the gel-like nature of the polymer above its crystalline melt temperature, roughly 135° C.-150° C. While ordinary polyethylene is a viscous, molasses-consistency liquid at such temperatures, UHMWPE is a swollen gel which has an extremely high viscosity, and which exerts exceptional frictional stress against the walls of extruders and the like. The problems associated with UHMWPE are described quite clearly by U.S. Pat. Nos. 3,883,631 and 3,887,319. For the reasons discussed therein, ram extrusion and compression molding have thus far been the only processes of producing UHMWPE products which are used extensively.

In compression molding, UHMWPE powder is introduced into a coffin-like mold of very thick section. A thick cover which fits within the mold cavity is then placed on top of the powder, and the whole assembly is heated to above the crystalline melt temperature while being compressed to very high pressure. The molds are then slowly and uniformly cooled, and the product, generally in the form of a thick slab, is demolded. For thin stock, for example of 1 cm to 3 cm thickness, the thick slabs are skived or "planed" to produce thin stock. The skiving process requires an extra process step, and can result in a product with end curl. As can be seen, compression molding is a cost-intensive and labor intensive method of producing UHMWPE products. However, it is essentially the only process which can be used to make panels or sheets of large width, and is thus still a much used process.

A continuous process for the production of thin gauge UHMWPE sheet has been used by Crown Plastics, Harrison, Ohio, U.S.A. In this process a roller belt press previously manufactured by Hoover Ball and Bearing Co. as the Lam-N-Hard laminator, and as described for use in wood lamination by Tarkow, et al., "Surface Densification of Wood," FOREST PRODUCTS JOURNAL, 18(a): 104-107, is used to consolidate UHMWPE powder. However, the process thus far has been limited to thin sheets with a maximum thickness of 3-4 mm and relatively narrow widths. Only recently has a 24 inch wide (0.6 m) sheet been produced by this method, and it is not believed to be possible to produce wider sheets due to the high pressures involved.

Ram extrusion is a unique process which is considerably different from melt extrusion. Ram extrusion may be illustrated with reference to U.S. Pat. Nos. 3,883,631; 3,887,319; and 4,145,175. Despite the fact that the ram extrusion technology disclosed in these references is more than 25 years old, there has been only incremental change in ram extrusion processes since that time.

The overall process may be described in relation to FIG. 1 which shows schematically, in cross-section, a simple ram extrusion machine for production of a UHMWPE rod. The ram extrusion machine consists of very thick section steel member 2 having a through channel 3 into one end of which is received ram 4. UHMWPE powder 5 flows gravitationally into channel 3 from hopper 6. The ram then travels to the left, compressing the powder in the channel, which is now die channel 7. This sequence is repeated every few minutes. Die channel 7 is heated by heaters 8 which surround the die, and heats the resin particles to a relatively high temperature, for example between 350° F. and 500° F. (177° C. and 260° C.). Temperatures in excess of 500° F. (260° C.) are generally avoided, since the polymer rapidly oxidizes above this temperature. Oxidized polymer exerts yet more friction with the die, and due to the oxidation, products have reduced physical characteristics. The ram exerts a pressure up to several thousand lb/in², and consolidates the heated, gel-like particles of UHMWPE. The UHMWPE rod 9 exits the die at discrete intervals and at this stage the rod is hot, higher than the crystalline melt temperature, and relatively translucent. However, at some distance from the die face, the polymer has crystallized to an opaque solid.

Ram extrusion has been used to produce round profiles of relatively large diameter, e.g. 300 mm, and also tubing, small profiles of complex shape, and "boards" having a width of up to about 660 mm, and thicknesses of, e.g. 100 mm. However, such boards are far from flat as produced. If flat boards or thin stock are needed, the boards are skived. Because of the high friction within the die, and consequently the very high pressures involved, the ram, even though made of very high strength steel, may buckle. This is particularly so in parts whose cross-section is quite asymmetric, and even more so in parts having a substantially rectangular cross-section of high aspect ratio. For example, a ram for producing a board of 1 cm×30 cm rectangular cross-section may exhibit buckling, whereas a ram for a thicker board, for example 10 cm×30 cm, will have virtually no problem in this respect at all. Not only can buckling be destructive of the ram, but the distorted ram may scrape the die walls, introducing metal particles into the product and altering die geometry.

It would be highly desirable to employ ram extrusion to produce sheets and panels of large width, for example 1 to 3 meters in width, and of a range of thicknesses, in particular, in standard thicknesses which can be sold as is, without skiving. However, attempts to use the ram extrusion process to prepare such sheets and panels meeting the necessary product standards have been largely futile. The failure of others in the past can be attributed to a number of factors. First, the nature of UHMWPE is such that there is considerable volume contraction upon both cooling and crystallization. Differential cooling or crystallization generates internal stress, as does also differing degrees of polymer orientation. In small profiles or even larger products which are relatively symmetrical, these problems are minimal, or are to a degree self-cancelling. However, in large widths, these problems manifest themselves as undesirable "product characteristics" such as thickness variations, bowing, warping, surface fracture, surface irregularities, "walking", edge waviness, etc. The larger the width of the product, the more difficult is the control of these properties. Such defects would then require minimally, shaving of the surface and machining to size. However, some defects, for example warp and bow, may be impossible to remove.

Moreover, the ram extrusion apparatus itself also has severe shortcomings. The large top and bottom surface areas associated with a slit die, coupled with the large internal pressure, create forces which are very difficult to control. A slit die of 1 cm height and 1 m width, and of 0.5 m length may experience a force of $2.1 \cdot 10^6$ N or more on each half of the die depending upon the internal pressure, which is always high. The restraining bolts in this case will have to bear almost $4.4 \cdot 10^6$ N of force. Even when such a die is constructed of high strength stainless steel of, for example, a 10 cm thickness on each side, the die will deflect so much due to the internal pressure that a board with pronounced greater thickness in the middle as opposed to the edges results. Dies of this size and construction will also rupture, unless supported by massive restraining structures located exterior to the die.

For all the above reasons, it has been considered impossible to produce wide sheets and panels of a quality which is commercially acceptable, by ram extrusion.

SUMMARY OF THE INVENTION

It has now been surprisingly discovered that flat panels of UHMWPE in widths greater than 0.4 m and of substantially constant thickness can be produced by ram extrusion through a slit die as a partially crystalline solid, the slit die provided with a plurality of transversely positioned cooling zones on both the top and bottom of the die proximate the exit of the die, and followed by a back pressure device. It has further been surprisingly discovered that a higher quality, flatter product is obtained if a die is provided which is sandwiched by a support structure, the die having a slit of non-uniform height when not under pressure, but in cooperation with flexure of the die and support structure under ram extrusion pressure, is distorted so as to provide a substantially flat product. Preferably, the die as described is used in conjunction with the multiple cooling zones and back pressure device to provide a stable and robust process.

BRIEF DESCRIPTION OF THE DRAWINGS

FIG. 1 illustrates schematically the process of ram extrusion.

FIG. 2 is a perspective drawing of a die and support structure for one embodiment of a ram extrusion machine suitable for producing wide panels.

FIG. 6 is a further embodiment of a subject invention die from the downstream direction.

FIG. 7 is a further embodiment of a subject invention die from the downstream direction.

FIG. 8 illustrates one embodiment of a ram suitable for use in the present invention.

FIG. 9 illustrates a further embodiment of a slit die and window frame restraint suitable for use in the present invention.

FIG. 12 illustrates a double band press as one embodiment of a vertical restraining device and back pressure device of the subject invention.

FIGS. 13a and 13b illustrates a pressure adjustable side guide.

DETAILED DESCRIPTION OF THE PREFERRED EMBODIMENT(S)

Figure 3:
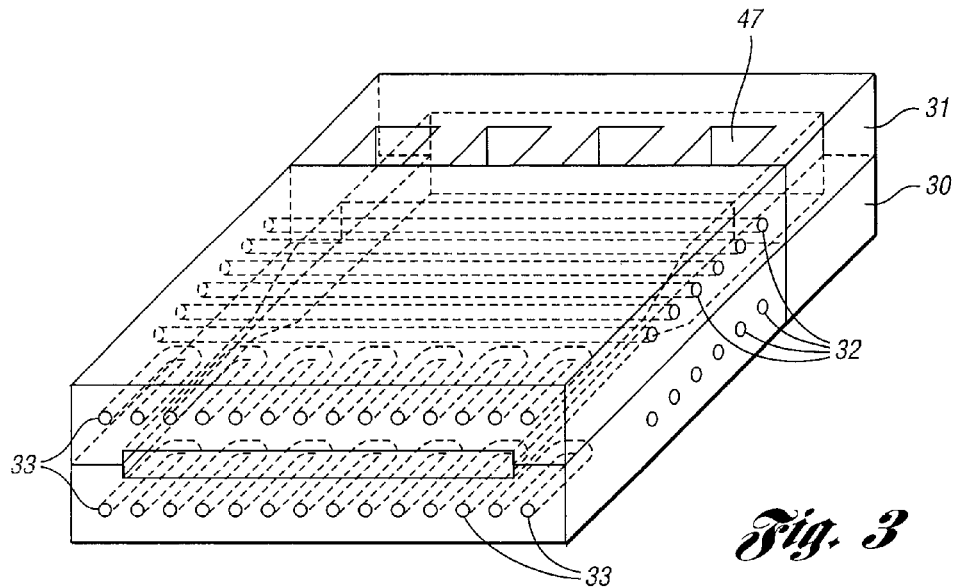
FIG. 3 is a perspective view of one embodiment of a slit die of the subject invention, showing the heating and cooling zones.

The ram extrusion process employed by the subject invention upstream from the die is substantially that described in U.S. Pat. Nos. 3,887,319, 3,883,631, and 4,145,175, herein incorporated by reference.

The present invention pertains to the ram extrusion of panels of high width and aspect ratio, as described hereinafter. The term "panel" refers to a substantially flat extrusion. Typically, the sharp corners of the nominally rectangular cross-section may be rounded, and indeed, the entire edge portions may be circular, elliptical, etc. A purely rectangular cross-section with sharp corners is generally not desirable due to stress points in the die at such corners. The principle utility of the subject invention is to produce large width sheets of constant thickness, this constant thickness extending to a position at or proximate the edge. Thus, by the definition of "panel" as used herein is meant a generally flat sheet of less than ±0.050 inch (±1.27 mm) thickness variation over a central portion of the panel which includes at least about 80% of the overall panel width, preferably at least 90% of the panel width, and most preferably 95% or more of the overall panel width. Thus, it would not depart from the spirit of the invention to produce a sheet having a "dumbbell" or other cross-section, with edge portions significantly thicker or thinner than the majority of the panel. These portions can easily be removed, preferably by the manufacturer but also by the end user, by conventional sawing or slicing steps.

Because of its large width and of its asymmetry due to the high width to thickness aspect ratio, the production of wide panels from a substantially rectangular die, i.e. a die with substantially parallel surfaces across its width, is very problematic, and many attempts to do so have failed. Unlike many smaller products which are ram extruded at exit temperatures above the crystalline melt temperature, panels of large width, upon initiation of crystallization, will distort in unpredictable ways due to the volume contraction which occurs during crystallization as well as internal stresses which are created. However, allowing full solidification prior to exit from the die is generally not practiced due to loss of contact with the die walls. If the die walls are progressively narrowed toward the exit, contact can be maintained, but the buildup of pressure can at times be so high as to separate the die halves, or even to rupture the die or its support.

The UHMWPE panels of the present invention are partially crystalline as a result of exiting the slit die of the ram extrusion apparatus at a temperature below the crystalline melt temperature. While for thin gauge panels, i.e., those having thicknesses of 1.5-2 cm or less, the entire panel temperature (e.g., throughout its thickness) may be less than the crystalline melt temperature, for thicker panels especially, the interior of the panel may be at a higher temperature. Thus, it is not necessary that the entire panel be at such a low temperature, provided that the surface of the panel, and preferably the panel interior to a depth of about 3 mm, is below the crystalline melt temperature. To further reduce the interior temperature of thick panels, the rate of extrusion can be slowed, thus spending more time in the cooling zone; the cooling zone may be extended; or the temperature of the cooling fluid can be lowered. These methods may be employed singly or in any combination.

Applicants have surprisingly discovered a means of providing a solidified product without loss of die contact, while minimizing any pressure excursions. The process employs a back pressure device. However, despite the use of a back pressure device, Applicants have found that it is very difficult to keep the process running in a stable manner, i.e. defined as producing a flat, commercially acceptable product with a small reject rate.

Applicants believe that the non-robust nature of such processes is in part due to the same factors which destroy product uniformity of amorphous panels during cooling and crystallization, but in this case the irregularities are exhibited within the die as opposed to outside the die. Applicants have surprisingly discovered that a more robust process can be provided if a plurality of cooling zones, preferably minimally three cooling zones, are located proximate the exit face of the die distributed along the width direction, in both the top and bottom die halves, or in a monolithic die, above and below the die slit. The plurality of cooling zones are preferably arranged symmetrically about a centerline of the die on either the top half, the bottom half, or both. Most preferably, 5-10 cooling zones or more are utilized on both the top and bottom, greater numbers being advantageous with increasing panel width. Thus far, for sheets of approximately 1 m to 1.2 in width, 5 to 7 zones of substantially equal size, as shown in FIGS. 2 and 3 are preferably used. The top and bottom die halves need not have the same number of cooling zones, but this is preferred.

A plurality of cooling zones are independently controlled. Each cooling zone is preferably independently controlled, although in a given installation it may be found that two or more zones may be controlled together. Experience has shown, however, that independent control is highly desirable and in most cases necessary. Each cooling zone preferably has its own inlet and outlet, although outlets may be shared in parallel with adjacent zones in suitable designs. Series connection of all zones will not work. The zones are fed cooling fluid, which may be gas or liquid, but is highly preferred to be liquid, due to the high heat removal demands. Cooling liquid may be water, although glycols or other heat transfer fluids may be used. Water is preferable, and a closed system with cooling means which assures uniform water temperature is desirable. The temperature in a given zone is measured by a suitable measuring means, for example by temperature sensors which are preferably thermocouples positioned in the die proximate the respective zone, and the flow and or temperature of coolant is regulated by conventional process controls. Preferably, proportional valving rather than on/off valving is employed, and temperature regulation is preferably adjusted by varying the rate of coolant flow rather than adjusting the coolant temperature. Temperature may also be adjusted by providing sufficient cooling to provide a lower than desired temperature, and then elevating the temperature to the desired temperature by electrical heating. This is not preferred. Temperature in each cooling zone is preferably regulated between ±3° F. (1.7° C.) of the set point, more preferably ±1° F. (0.6° C.).

The temperatures of the individual zones are adjusted to provide a flat product, although as indicated previously, it may be possible to link one or more individual zones together in a "group". In one machine embodiment, the cooling zones positioned across one of the die halves will be at the same temperature for the majority of the machine operation, and the cooling zones in the lower die half will be at a uniform temperature relative to each other, but at a temperature different from the temperature of the upper die half cooling zones. Depending in part upon the length of the cooling zone in the machine direction, the temperature of the individual zones may range from 80° F. (27° C.) to 200° F. (93° C.), preferably from 90° F. (32° C.) to 180° F. (82° C.). The bottom cooling zones are in general maintained at a lower temperature than those on the top, i.e. different by about 1° F. to 25° F. (0.6° C. to 14° C.), in general about 3° F. to 15° F. (1.7° C. to 8.3° C.). It has been surprisingly discovered that the lower temperatures produce sheets with shot marks of relatively low height.

The machine operator, observing the panels exiting the machine, will adjust the cooling zone temperature individually if warpage or surface imperfections are noted. For example, if the panel warps or curls in an upward direction on the far right side, the top and bottom zones corresponding to the position of the warpage will be adjusted by making the top zone colder or the bottom zone warmer, or both. In general, it is desirable to have the temperature of a given zone as close as possible to adjoining zones to minimize uneven cooling. In like fashion, if the entire sheet bows uniformly, i.e. "curls", then the temperature differential between the top and bottom zones is adjusted to remove the bow. Only minimal training of the operator is required to maintain stable operation.

The process can also be easily implemented as an automatic process in hardware and/or software, for example, by scanning the panel transversely at one or more positions along its length by means of an optical comparator or the like, or feel gauges, etc., which detect warpage or bowing, and make corrections automatically. It should be noted that due to the nature of the problems associated with ram extrusion of high aspect ratio panels, numerous factors will cause instability, for example, fluctuations in coolant temperature, raw material batch changes, etc, and even the opening of a door to the operating environment. Further information regarding the cooling zones will be presented in the Examples.

While the plurality of cooling zones transverse to the machine direction proximate the exit face of the die offer a great improvement in operation, greater stability of the process is desirable. The use of a back pressure device to aid in maintaining contact has been noted. Applicants have found that the combination of multiple transverse cooling zones; a back pressure device, preferably one with a plurality of individually adjustable back pressure zones transverse to the machine direction (as more fully described hereafter); and a dual taper slit die (as also more fully described hereafter), can produce a high quality, flat sheet material over extended product campaigns.

The panels of the subject invention should be flat, i.e. free from warp and bowing, and also of uniform thickness, preferably ±0.030 inch (0.76 mm) The cross-section is thus substantially rectangular. However, the sides of the panels are generally rounded at least at the corners, since such rounding lowers the pressure in the die and also eliminates sharp die corners, which would then be points of stress which could crack at the high pressures involved. By "substantially rectangular" is meant a generally flat sheet when viewed from the end, with perpendicular, curved, or radiused sides, and parallel or substantially parallel main surfaces. For thick panels, a cross-section will actually appear rectangular, with radiused or "softened" corners. For thin panels, the radiused corners dominate the edge and the panel cross-section appears less rectangular. However, such flat panels are still considered "substantially rectangular." Likewise, a rectangular die slit is one which has two faces having a length equal to the width of the panel to be produced, whose faces are flat and parallel to each other under extrusion pressure, the faces connected by sides which are preferably rounded or radiused. It is the flatness of the panels, and of the die faces which produce a substantially flat panel, which satisfy the definition of "substantially rectangular" herein.

It has been found, however, that if a die having substantially rectangular geometry when not under operating pressure is employed as a die in the extrusion of large width UHMWPE panels, the resulting panels will not have uniform thickness, will have numerous surface irregularities, and in general, will be a commercially inferior and generally unacceptable product. For most applications, such products have to be surface machined or skived to produce a flat surface. This process is wasteful of expensive polymer and adds further process steps, which further increases cost. For thin panels especially, the amount of waste would be excessively high.

It has been found advantageous to utilize a die which is manufactured with a slit shape which is other than substantially rectangular, in particular a shape in which the edge regions of the top and bottom surfaces of the die slit are not flat and parallel to each other, in conjunction with a support structure which, like the die, distorts under stress, the die and support structure coacting such that distortion of the non-rectangular die under operating pressure transforms the die opening into an opening such that a flat product is produced, in other words, a "substantially rectangular" geometry. In a further embodiment, the die and support structure are merged into one, by employing massive die top and bottom halves. Such a massive die is not preferred, due to its cost.

By the term "slit die" is meant a die having a passage therein through which UHMWPE will be ram extruded, the slit having a width considerably greater than its height over relevant portions thereof. While numerous terms and descriptions can be used for the die and portions thereof, one skilled in the art recognizes the basic construction of the die from the description herein and the drawing figures. For example, when discussing the geometry of the slit relative to the geometry of the ram extruded panel, it is the shape of the product-defining portions of the die, i.e. the exit slit on the exit face of the die and a distance upstream thereof where the panel shape is being defined which are important. In this context, unless specified otherwise, the term "exit slit" also includes the portion of the die upstream from the panel exit slit, this portion of the die preferably although not necessarily having the same basic geometry as the panel exit slit per se.

For example, in a preferred embodiment, the slit will widen vertically upstream towards the ram entrance area ("vertical taper"). This vertically tapered portion of the die may be considered as part of the slit of the slit die or may be considered a separate portion thereof, communicating with a generally parallel slit. Regardless, while the vertical taper may alter product properties and other factors, for example the length of the die in the machine direction, the product shape is not defined in this section of the die or in the preceding section, where the tongue of the ram enters and first compresses resin powder. The various portions of the contiguous slit may, if necessary, be subdivided into a panel exit slit, i.e. the hole in the exit face of the die; a portion proximate the exit slit, i.e. that portion of the die extending upstream towards the ram and terminating at the downstream end of the vertical taper; the slit taper portion; and ram inlet portion, i.e. that part of the slit beginning proximate the resin powder inlet (powder supply passage) and the point of furthest innermost penetration of the tongue of the ram. The ram inlet portion terminates upstream with the ram entrance slit on the inlet face of the die. "Machine direction" has its accustomed meaning, i.e. a direction parallel to the extrusion of the panel through the machine, upstream being toward the ram, and downstream in the extrusion direction. "Transverse" means a direction perpendicular to the machine direction in a plane which includes or is parallel to a line drawn centrally across the exit slit of the slit die.

The preferred die geometry is one in which the most central portion of the die is of lesser height than edge regions of the die. When the die expands against the support structure, the edge regions of the die will distort the least, while the central area, and the support structure above and below the central area, will distort more, bringing the faces of the die to a substantially parallel geometry. For the purposes of this invention, a die will have substantially parallel geometry if, during operation, a panel of minimally 0.4 m width which has thickness variations over its width of less than 0.050 inch (1.27 mm) is produced. Applicants have discovered that a high quality panel of large width may be produced by employing a die which preferably has a dual taper, and one in which the die is cooled proximate the exit such that the panel exits the die at a temperature below the crystalline melt temperature.

The dual tapers of a preferred embodiment of the subject invention die may be divided conceptually into a vertical taper and a transverse taper. The vertical taper is a narrowing of the die proximate its inlet end as viewed from the side, i.e. a narrowing in a vertical direction. The transverse taper is a narrowing of the height of the die slit in a direction transverse to the machine direction, i.e. across the width of the continuously produced panel stock.

Figure 4:
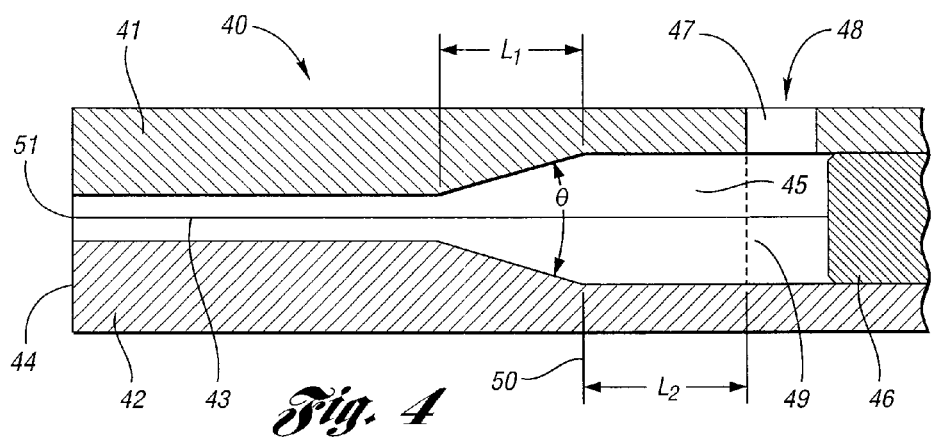
FIG. 4 is a cutaway view of one embodiment of a die from the side, showing the vertical taper in exaggerated form.

The vertical taper is more clearly shown by reference to FIG. 4. The die 40 is preferably machined from stainless steel in two parts 41 and 42. The die slit 43 is of substantially constant height in the machine direction, up to the vertical taper, although it is possible to provide an additional narrow taper to the die in the hot zones of the die. Thus, instead of a single vertical taper, there may be multiple vertical tapers, or a taper of progressively changing slope, the die walls becoming substantially parallel prior to the die exit face 44, and prior to or proximate the cooling zone. The area 45 is the ram entrance area, and has substantially constant height to accommodate ram 46. Opening 47 allows UHMWPE powder 48 to be introduced into cavity 49. The ram advances toward the die exit face 44 and stops at point 50, thus compacting the resin powder over a length $L_2$. The vertical taper starts at point 50, although it may also start later, i.e. further toward the die exit face 44. The taper, unlike those taught by the prior art for use in manufacturing small profiles, is quite minimal, the included angle θ, preferably being less than 10° altogether, more preferably less than 5°, and most preferably between 1° and 3°. The taper may be symmetrical about the centerline 51 of the die, or may be asymmetric to the extent that all the taper is expressed in one of the die halves. Preferably, the taper is evenly divided between the die halves, and is somewhat less than 3° in total. The taper extends over length $L_1$. This length is determined by the angle of the taper and the ratio of the height of the entrance ram channel and the nominal height of the exit slit of the die. In a die for producing panel stock of nominal 0.375 inch or about 1 cm thickness, the length of the vertical taper is preferably about 3 inches (7.5 cm). If the length of this taper is too long, or extends substantially into the cooler zones of the die, the well known incompressibility of UHMWPE will tend to force the die halves apart to an even greater extent than that due to normal internal pressure.

The vertical taper, as indicated, may constitute plane walls, walls having a contiguous multiplicity of plane surfaces each at a different angle from a center plane through the die, may be a continuous non-planar surface, for example a surface with circular or generally curvilinear cross-section, a contiguous multiplicity of such surfaces, or any combination thereof. In the case of curved surfaces or multiple contiguous surfaces, the included angle as defined herein is the angle a plane beginning at the start of the overall taper in the die top portion and ending at the constant geometry portion of the slit (the end of the taper) makes with a corresponding plane in the die bottom portion.

Figure 5:
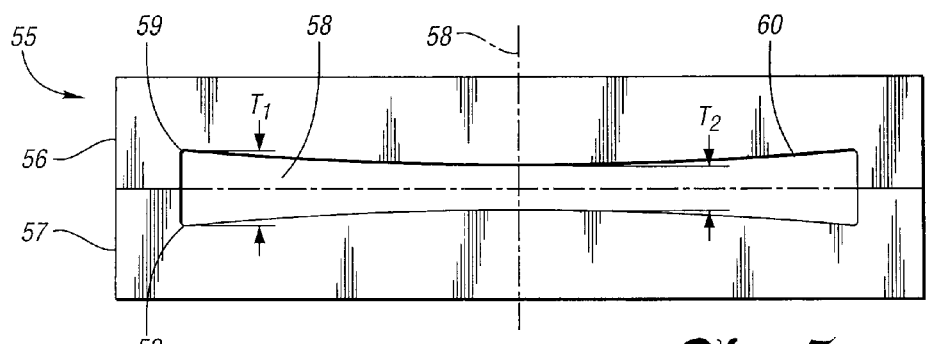
FIG. 5 is a view of one embodiment of a die from the downstream direction.

FIG. 5 illustrates one embodiment of the exit face of a subject invention die. In this embodiment, the die slit becomes increasingly narrow as one progresses toward the centerline 58 of the transverse direction. The die 55, again, is shown prepared in two pieces 56 and 57. At the edge of the die slit 58, the height $T_1$ is substantially the same as the nominal thickness of the panel to be produced, but is generally slightly greater than the panel following exit from the die. The corners 5a are preferably chamferred or radiused e.g. at 59, to relieve stress and minimize friction. At the centerline of the die, the height $T_2$ is less than $T_1$. For a panel of a width of nominally 1.2 m the difference $T_1-T_2$ is approximately 0.05 mm to 0.5 mm depending upon the deflection of the die and its support structure, more preferably around 0.3 mm. The shape of the die surface which contacts the UHMWPE may expediently be a conic section, at least in part. Examples of such conic sections are parabolae, hyperbolae, oblate and prolate ellipses, circles, etc. It should be noted that unless otherwise indicated, a "curvature" includes a curve of infinite radius, i.e. a straight line.

If T is the height at the edge of the die exit slit, the height at other portions of the die may be roughly established by Te and Tm where Te is the height at a distance De from the cavity edge, where De is 9 inches (22.5 cm) or less, and Tm is the height of the cavity at a distance Dm from the cavity edge where Dm>9 inches (22.5 cm). The values of Te and Tm for dies of nominally 1.2 m width is then given by $$Te = T_1 - 0.00275\, De \text{ and}$$

$$Tm = T_1 - [0.00275\, De - (0.00175\, (Dm-De))]$$

The constants 0.00275 and 0.00175 are related to the thickness of the die (not the cavity height), the thickness of any supporting structures, the width of the die, etc. Due to the complex nature of the process and the intricacies of the die, etc. per se, for example the cooling passages, die length, die transition zone, etc.; for dies of appreciably different dimensions, different constants and different limiting values of De and Dm must be determined Resort may be had to techniques such as finite element analysis, for example, software for which is readily available. However, it may be more expedient to machine the die by trial and error, with the material removal being conservative, such that the final shape is approached by successive refinements without having to begin the machining process again.

The difference $T_1-T_2$ may be determined empirically by production of a die having a small and preferably inadequate value of $T_1-T_2$, performing a trial ram extrusion, and measuring the differences in thickness of the panel produced in a direction transverse to the machine direction. If significant differences in thickness or surface irregularities are noted, the die can then be machined to produce a greater height variance in the slit. It should be noted that the most advantageous shape of the die surface 60 is not necessarily circular, but may indeed be parabolic, hyperbolic, ellipsoidal, etc., and may in fact, as later discussed, be multiply tapered.

It has been found through a great deal of effort, that the shape of the die slit and the value of $T_2-T_1$ is dependent on several factors which together define the requisite geometry. By the latter term is meant a die slit shape which, in conjunction with the operating parameters of the machine, e.g. resin type, temperature, internal pressure, length (machine direction) of die, width (transverse) of die, preferably produce a panel product having a width of at least 0.4 m, with a thickness variation across the width of the panel of less than 0.050 inch (1.27 mm), more preferably less than 0.030 inch (0.76 mm), and most preferably less than 0.020 inch (0.51 mm) Since these values are total thickness variation, the surface height fluctuations are generally ± half these values, i.e. preferably ±0.010 inch (0.25 mm) or less.

The parameters which are most important in determining the transverse slit taper are: the internal pressure; the width of the panel; and the deflection of the support structure restraining means preferably used. As the width of the panel increases, the force exerted on the two mold halves, at any given pressure, increases also. This pressure will tend to force the mold halves apart, and in prior machines, has literally done so. The die halves of the preferred embodiment of the subject invention machines are about 11-12 cm in thickness. If these die halves were unsupported on their exterior, they would bend so much in producing a 1 cm thick panel 1.2 m wide that they would buckle and break. It would be possible, of course, to make the die halves of much thicker material.

However, stainless steel is expensive, and even were the die halves 25 cm thick, bending would still be severe. A preferred material for the dies is T420 stainless steel, preferably polished and coated with a wear resistant and preferably lubricious coating. Conversion coatings, and preferably metal coatings, such as hard chrome or nickel, may be used. Advantageously, diamond-like carbon (DLC) coatings such as supplied by Diamonex Products, Allentown, Pa. as Diamonex® DLC or amorphous diamond coatings such as are disclosed in U.S. Pat. No. 6,103,305, herein incorporated by reference, are used. Such diamond coatings are well known for their low coefficients of friction. Peripheral die components can be made of hardened steel, for example PHS 4140 prehardened steel.

The degree of distortion of the die along the direction transverse to the machine direction is dependent upon the width of the panel being produced. The greater the panel width, the greater the internal die surface area and the greater the force exerted on the die halves. Moreover, transverse to the machine direction, the distortion may be viewed as a force moment distant from the securing devices uniting the die halves. For example, in a two piece die secured on its flanks by a series of bolts or similar devices, distortion will be greater the further from the securing devices. Thus, the die will distort somewhat more in the middle than at the edges. Moreover, the force on the securing bolts will receive a much greater contribution from the central area of the die than from the edges of the die.

To decrease the distortion of the die, a "window frame" support structure is preferably used with the dies of the present invention. The "window frame" consists of massive supports above and below the dies, these supports having a high modulus. Preferably, the supports are made of carbon steel, for example Viscount®-44 steel. The supports are shown in FIGS. 2 as 21 and 22 above and below the die 20. These, together with connecting bolts 23 which are located on both sides of the structure, form a "frame" about the die halves 20a and 20b, keeping them in compression. In a preferred machine, the upper 21 and 22 lower supports are about 40 cm thick or of greater thickness, and about ¾ as long as the die in the machine direction. They are wider than the die halves by some 10-15 cm on each side so that massive bolts may be used to tension all together. Despite the massiveness (ca. 3 tons of steel each) of the supports, deflection is still observed. However, the more massive the support the less the deflection. A plurality of individual supports rather than a single support may also be used.

Thus, for relatively "narrow" panels of 0.4 to 1 m, by using supports of exceptionally heavy section, for example 1 m in thickness, or by reverse beveling the supports to counter distortion, the die slit may have minimal transverse taper or even no taper. However, such massive supports are generally undesirable, as they not only increase machine cost, but engender a severe weight penalty as well, thus requiring a stronger and hence more massive base, i.e. floor, to support the weight.

FIG. 6 is an alternative embodiment which is particularly useful for panels less than 1.2 m in width. In FIG. 6, where the tapers are exaggerated for clarity, the die 60 is again of two parts, 61 and 62. The slit 63 has a flat section 64 in each die half, and tapered sections 65, which taper at a very low included angle $\theta_2$. This included angle is generally much less than 0.5°, and is preferably around 0.1°. A taper of 0.05° in each mold half, for example, may be satisfactory. The junction 66 between flat section and taper may be smoothed or radiused. The taper, transition between tapered portion and flat portion, and length of flat portion, are adjusted such that a flat panel is produced.

FIG. 7 illustrates a preferred embodiment of the present invention, which combines the features of both FIG. 5 and FIG. 6. In FIG. 7, the die 70 for a panel of approximately 1.2 m width and 1 cm thickness, has side tapers 71 as in FIG. 6, preferably extending inwards from the edge of the die for about 10-40 cm, preferably 20-30 cm, at an angle $\theta_2$ of preferably between 0.02° and 0.1°, most preferably about 0.06°. The central portion 72 of the die faces, rather than being straight, is curved inwardly ("convex"), towards the horizontal centerline of the die, with a long radius L, for example of 200 m to 1000 m, preferably 250 m to 500 m. The central portion of the die is convex on each face, and has a radius preferably of 1000/2 W where W is the width of the exit slit in meters. Coupled with a window frame support of a thickness of about 40 cm, it has been surprisingly found that these relatively non-planar die surfaces, with a dual taper (side taper plus central curvature), do not result in a product of tapered thickness, but rather produce a flat panel product of highly uniform thickness and excellent surface quality.

In a further embodiment, the slit die is machined to have a straight, non-tapered main section, or even one with a reverse taper, i.e. with greater height in the middle than at the edges, but is used with contoured window frame supports, as shown in FIG. 9, where again the contours are exaggerated for clarity. Supports, 91, 92 have inwardly tapered surfaces 93, 94 which, when assembled bearing on die halves 95, 96, will distort slit 97 such that the shape is not substantially rectangular, but is more similar to the shapes of FIGS. 5 and 6. Thus, when assembled, the die will not be substantially rectangular. Under operation, however, the pressure in the mold will attempt to force the die halves apart, the support structure surface abutting the die will bend upwards centered about the middle of the support, and the slit will bow outwards and distort to near net shape, i.e to a shape which produces a panel product of substantially rectangular cross-section.

Thus, with respect to the die geometry, the shape of the slit is such so as to provide substantially planar top and bottom surfaces of the product panel when under load, i.e. at the high operating pressure of the ram extrusion process. This achievement is accomplished by providing a contoured mold which distorts to the desired shape under load; a non-contoured mold with a contoured and distortable window frame, or a non-contoured mold with a massive and substantially non-distortable window frame. For a die of ca. 1.2 m width and ca. 1 cm exit slit height, the supports above and below the die will have to be about 0.75 m thick for the latter embodiment. Preferred dies also have the vertical taper previously described.

The rams used in producing the panels of the subject invention are stepped rams, as illustrated in FIG. 8, preferably made of high strength steel such as Viscount®-44 steel. The end 71 of the ram 70 which penetrates into cavity 45 of FIG. 4 has a thickness of just slightly less than the thickness of the cavity, and a length approximately $L_2$ (see, FIG. 4). The ram is preferably hydraulically operated by one or more hydraulic cylinders, and enters the die through a seal, for example of polyamide. The foregoing attributes of the ram are typical of rams used in ram extrusion of conventional shapes. From the narrow end 71 toward the hydraulics (at the right, not shown), the thickness of the ram increases significantly to a much thicker section 72. This thicker section reduces the flexure and any tendency to buckle which would otherwise occur. The thickness of the ram portion 72 may be 7 cm, for example, while the "tongue" 71 may be 1 cm. Note that the tongue of the ram, in the case of the preferred embodiment, is only slightly thicker than the die thickness at the exit end, by a factor corresponding to the vertical taper of the die. It is also possible to employ rams having a tongue of the same thickness as the die exit, but this is not preferred, except perhaps in panels of greater thickness, e.g. 4 cm, preferably 10 cm or more.

The die contains at least one heated and one cooled section relative to the machine direction. One heated section is proximate the portion of the die where the ram enters the die, although it may also be advantageous to establish a cooling zone between the ram entry point or cavity 45 of FIG. 4 and the heating zone, to minimize the sintering of resin powder near the powder inlet. The heating zone preferably begins about 6 inches (15 cm) prior to the beginning of the vertical taper in the upstream direction and continues for a length downstream along the machine direction such that full consolidation of UHMWPE occurs. This length will vary inversely with the temperature established in the heated zone, the "hot zone", and directly with the thickness of the panel. Neither of these inverse and direct variables are necessarily linear. Thicker panels require a longer period at a given temperature to consolidate the interior of the panel. The temperature in the hot zone is preferably from 275° F. (135° C.) to 500° F. (260° C.), more preferably 400-450° F. (204-232° C.), most preferably about 420° F. (216° C.). Temperatures higher than 500° F. (260° C.) will tend to cause oxidative degradation of the resin, and are not desired. The hot zone may be divided into several subzones of varying temperatures. Temperatures are sensed by conventional devices, preferably by thermocouples interfacing with automatic temperature control devices. Heating is most preferably accomplished by cartridge heaters inserted transversely into the die.

A plurality of such heating zones is shown in the perspective drawing of a slit die in FIG. 3. Both die halves 30 and 31 have a plurality of passages 32 bored through the die transverse to the machine direction. These passages may contain cartridge-type resistance heaters, or may use hot oil, etc., as a heating fluid.

The cooling section is preferably located proximate the exit of the die, and consists of a plurality of cooling passages 33, each having an inlet and an outlet. Other arrangements of cooling zones, for example a plurality of inlets bored parallel to the machine direction and communicating with one or more common outlets bored transversely to the machine direction are also possible. The arrangement itself is not critical. However, whatever the arrangement, the cooling zones must allow for temperature variation to be established as desired transverse to the die slit, for example to maintain the central area of the slit at a higher or lower temperature than the edge regions, or intermediate zones.

It is highly beneficial to the operation of the present ram extrusion process to minimize the build-up of pressure within the die. Good temperature control is a necessary requirement for producing a consistent product, but increasing temperature does not have a great effect in lowering operating pressure since UHMWPE is gel-like and rubbery, rather than a viscous fluid. It has been discovered that addition of small amounts of long chain fatty acids and fatty acid salts such as stearic acid, palmitic acid, linolenic acid, and their salts, particularly their calcium and zinc salts, aid in lowering internal pressure, presumably by lowering friction of the gel particles with the die walls. Other lubricants such as montan esters, amides, polyethylene waxes, silicone oils, and the like are also suitable. Such lubricants are generally used in amounts of from 0.1 to 3% by weight, more preferably 0.2 to 2% by weight, most preferably 0.5 to 1.5% by weight. It is important, however, to minimize the amount of lubricant to avoid loss of mechanical properties. Thus it is preferable that 1.5% or less be employed.

It has also been surprisingly discovered that minimizing oxygen content of the resin powder during the process greatly lowers operating pressure. Typically in ram extrusion, resin powder is pneumatically directed to a supply hopper above the ram extrusion machine by air. It has been found that if an oxygen-free gas is injected into the hopper, preferably at or near the bottom, to sweep or "sparge" air out of the hopper, the pressure in the die is lowered by 150 to 200 lb/in$^2$ (1 MPa-1.4 MPa), a very surprising amount. This reduction in pressure may result in lowering the force exerted against the die halves by as much as $1.5 \times 10^4$ lbs pressure (67 kN) in a 1 m×0.5 m die. Any oxygen-free or oxygen-depleted gas may be used, including helium, argon, carbon dioxide, nitrogen, or the like.

The UHMWPEs employed in the process are conventional powdery resins, as supplied by Ticona, Braskem, and DSM, for example. Preferred number average molecular weight ranges are between $2 \cdot 10^6$ Da and $10 \cdot 10^6$ Da, more preferably between $4 \cdot 10^6$ Da and $8 \cdot 10^6$ Da. Although the preferred UHMWPE used in the present invention is homopolymeric or substantially homopolymeric, i.e. with only a low content of copolymerizable comonomers, the compositions may, as also indicated elsewhere herein, include conventional processing aids or property-modifying additives. Examples of the latter groups of components include, but are not limited to, components such as thermal stabilizers; UV stabilizers; nucleating and clarifying agents; dyes and pigments; electrically conducting materials such as metal powders, carbon powders, graphite and the like; fillers, for example non-reinforcing fillers having BET surface areas <50 m$^2$/g and reinforcing fillers such as fumed silica having surface areas $\geq$50 m$^2$/g; lamellar reinforcements such as mica, expanded shale, and the like; fibrous reinforcement in the form of chopped or otherwise attenuated fibers, for example glass fibers, ceramic fibers, aramid fibers, metal fibers, carbon fibers, thermoset and thermoplastic fibers such as those of polyimide, polyetherimide, polysulfone, polyethersulfone, polyether ketone (PEK) and its variants (PEKK, PEEK, etc.); tougheners such as particulate elastomers; other thermoplastics, such as non-UHMW PE; plasticizers, etc. The amounts of such additives is generally small.

Having described in detail individual components of the present invention, a preferred embodiment is a ram extrusion process employing a slit die having a width greater than 0.4 m and preferably having an aspect ratio of width to height greater than 10:1, more preferably greater than 20:1, and yet more preferably greater than 40:1, the die having a top portion and a bottom portion, each of the top and bottom portions containing a plurality of three and preferably at least five cooling zones positioned across the width of the die, the temperature of a plurality of zones in each set of zones being independently adjustable. The length of the cooling zone in the machine direction and the temperature of the zones are such that a UHMWPE panel exiting the die has cooled below its crystalline melt temperature at its surface and is at least partially crystalline.

In another preferred embodiment, a two piece die, the exit of which is not the shape of the desired cross-section of a ram extruded product when not under pressure, is contained within support structure of high strength and modulus which bears against the die halves and restrains their distortion outwards at the operating pressure of the ram extrusion process. However, under pressure, distortion which cannot be completely restrained by the support structure distorts the die and support structure in such a way that the die exit assumes a shape which allows the ram extrusion of panels of at least 0.6 m width and preferably of at least the aspect ratios previously described, the panel having variations in thickness of less than 0.050 inch (1.27 mm), preferably less than 0.030 inch (0.76 mm), and more preferably less than 0.015 inch (0.38 mm) The die has at least one cooling zone in each die half, proximate the die exit, such that the UHMWPE panel exiting the die is at a temperature below the crystalline melt temperature, preferably below 137° C., more preferably below 250° F. (121° C.), more preferably below 120° C., yet more preferably below 110° C., still more preferably in the range of 40 to 100° C., and most preferably between 75° C. and 85° C.

In a yet more preferred embodiment, the die of the foregoing embodiment has a small vertical taper or "narrowing" from the height of the die where the ram enters, to a somewhat uniform and narrower height along the machine direction towards the die exit. Also, in this preferred embodiment, the shape of the die transverse to the machine direction is such that the height of the die slit is less at the center of the slit than at the edges of the slit, and the support structure consists of heavy steel slabs machined to have substantially flat faces which bear against the respective die halves. The steel slabs are tensioned by a plurality of threaded connectors, most preferably by multi-jackbolt tensioners such as those available from Superbolt, Inc. Carnegie, Pa., and described in U.S. Pat. Nos. 6,263,764; 6,112,396; 6,381,827; 6,199,453; 5,083,889; and 4,846,614.

In a yet more preferred embodiment, the die of the foregoing embodiment is employed, and is also provided with a plurality of at least three cooling zones in each die half, as previously described. The temperatures of the various cooling zones are set to provide stable extrusion of the panel product, and are individually adjusted when necessary to counter process variations which produce warp, bow, surface irregularities, and thickness variations, these adjustments preferably being made during operation of the machine. The product variables most commonly adjusted are panel flatness, thickness uniformity, and surface quality.

In order to take advantage of the homogeneity in crystallization and the greater uniformity of product characteristics engendered thereby, it is necessary to maintain contact between the panel and the walls of the die prior to the panel's exit therefrom. The die is relatively massive and possesses a great deal of "thermal inertia," i.e., resistance to changes in temperature. In addition, the die is temperature regulated, both in the heating and cooling zones. By maintaining contact with the die, the thermal inertia is taken advantage of, maintaining a uniform temperature and a uniform rate of temperature change in the UHMWPE panel. The result is substantial uniformity in the degree of crystallization.

However, numerous factors may encourage loss of contact of the panel with the die. One principle cause of this loss of contact is the differential flow rates experienced at the edges of the die as compared to the central portion of the die. Additional fluctuations may be caused by changes in resin powder composition, the temperature of the die proximate the exit, particularly uncontrolled temperatures across the width of the die, temperature excursions due to fluctuations in coolant temperature and/or flow, material shrinkage, etc.

When the panel loses local contact with the die, the rate of crystallization at these localities changes, inducing changes in volumetric shrinkage and also inducing stresses which accompany these changes. As a result, the panel may warp; bow; exhibit edge curl; or may "walk," circumscribing a curved path, rather than a path parallel to the machine direction (a "linear path" as used herein) as it exits from the die. Loss of contact also generates differences in local thickness, to the extent that flatness requirements (±0.050 inch (1.27 mm), preferably ±0.030 inch (0.76 mm), more preferably ±0.020 inch (0.51 mm)) cannot be met. Since these changes often occur during established runs, their correction is needed if a stable process, which has a low scrap rate, is to be provided.

It has now been surprisingly discovered that contact of the panel with the die walls can be markedly improved by imposing an adjustable back pressure onto the panel which has exited the die. The back pressure is adjustable not only in absolute amount, which is generally the least pressure which ensures stable operation, but is also differentially adjustable over the width of the panel, i.e., transverse to the machine direction.

The back pressure is provided by a back pressure device located proximate to the die exit. It should be noted that the back pressure device causes no or substantially no change in the thickness and/or the width of the panel, because the panel is a solid at this point, being below the crystalline melt temperature. Rather, the pressure exerted is a frictional restraint on movement of the panel away from the die, and which translates to the die exit and even into the die interior, e.g., to the heated portions of the die, forcing the UHMWPE to maintain contact with the die walls substantially throughout the length of the die, but most importantly over the cooled section proximate the die exit slit.

The location of the back pressure device is preferably as close to the die exit as is conveniently possible. A distance of 1 cm to 20 cm, preferably 2 cm to 10 cm is preferable, for example. Greater distance may allow for buckling or bowing of the panel due to the back pressure generated, particularly with thin panels of high aspect ratio. Such panel distortion may not be easily recoverable, and thus close spacing between the backpressure device and the die is preferred.

The position of the plurality of back pressure generating elements across the width direction of the panel is desirably symmetrical transverse to a centerline of the panel in the machine direction, but small departures from symmetry can be tolerated. For dies which have been used for extended periods and which exhibit non-uniform wear in the die interior, purposeful deviation from symmetry may be desired. However, assuming a symmetrical and uniform die contour, a symmetrical arrangement of pressure generating elements is preferred. Working in tandem with the back pressure device are optional pressure adjustable side guides that help contain and center the extrusion under the back pressure fixture. These work as a guide to hold in position an extrusion that might otherwise naturally tend to move to the left or right under different back pressure settings across the width of the extruded panel.

The back pressure device may take numerous forms, so long as the device operates to impede the movement of the UHMWPE panel in the machine direction, thus imparting back pressure, and preferably is differentially adjustable across the width of the panel such that portions of the panel may experience greater or lesser back pressure than others. For example, the device may consist of a row of textured or elastomer-coated upper and lower roll pairs distributed across the width of the panel, which press against the panel and are frictionally restrained in rotational movement, this rotational restraint being adjustable between roll pairs. the rotational restraint may be achieved through the use of electromagnetic braking devices, hydraulic devices, etc. The textured surfaces of the rollers, when used, should be such as to avoid leaving an impression on the smooth UHMWPE panel surface. Most preferably, however, the back pressure device consists of one or a plurality of "boards" spaced across the width of the panel, and a plurality of pressure applying means, for example adjustable bolts, adjustable spring devices, or preferably, hydraulic or pneumatic cylinders, all of which may be termed "pressure actuators." While the "boards" may be made of numerous materials, such as fiberglass or carbon fiber composite materials, thermoplastics, metal, etc., it is highly preferred that the board(s) be a wood product, preferably solid wood lumber or plywood, preferably covered with a non-marring woven or non-woven textile material.

Other back pressure devices include any devices which can retard movement of the extruded panel away from the die such that a back pressure is created. Since the UHMWPE panel is extruded below the melt temperature, the panel may be gripped by clamps along the edge, may be restrained by servo-driven continuous belts, etc. For example, a plurality of such belts arranged parallel to each other in the machine direction may be used. Pressure may be supplied as well be inflatable bladders, including metallic bladders or bellows. These may be appropriately coated to provide the desired amount of sliding friction in order that the panel may advance away from the machine while still being restrained.

The vertical pressure on the back pressure elements is preferably supplied by hydraulic or pneumatic cylinders, preferably the latter. For example, 4 inch (100 mm) air cylinders, one or more bearing against each pressure element, and operated at up to 100 psig (6.9 bar gauge), preferably 25 (1.7 bar gauge) to 100 psig, have been found satisfactory during extrusion of a ca. 1 cm thick by 1.2 m wide panel. Greater flexibility in operation can be achieved if each side of the pressure elements, when individual pressure elements are used, are independently subjected to pressure. Thus, for example, each individual upper pressure element, which may be slightly in excess of 1 m in length and 0.4 m in width, may be actuated by right hand and left hand pairs of pneumatic cylinders. For added pressure, these pairs of pneumatic cylinders may be doubled or tripled, for example with one pair at the upstream end of the board and one pair at the downstream end.

Figure 10:
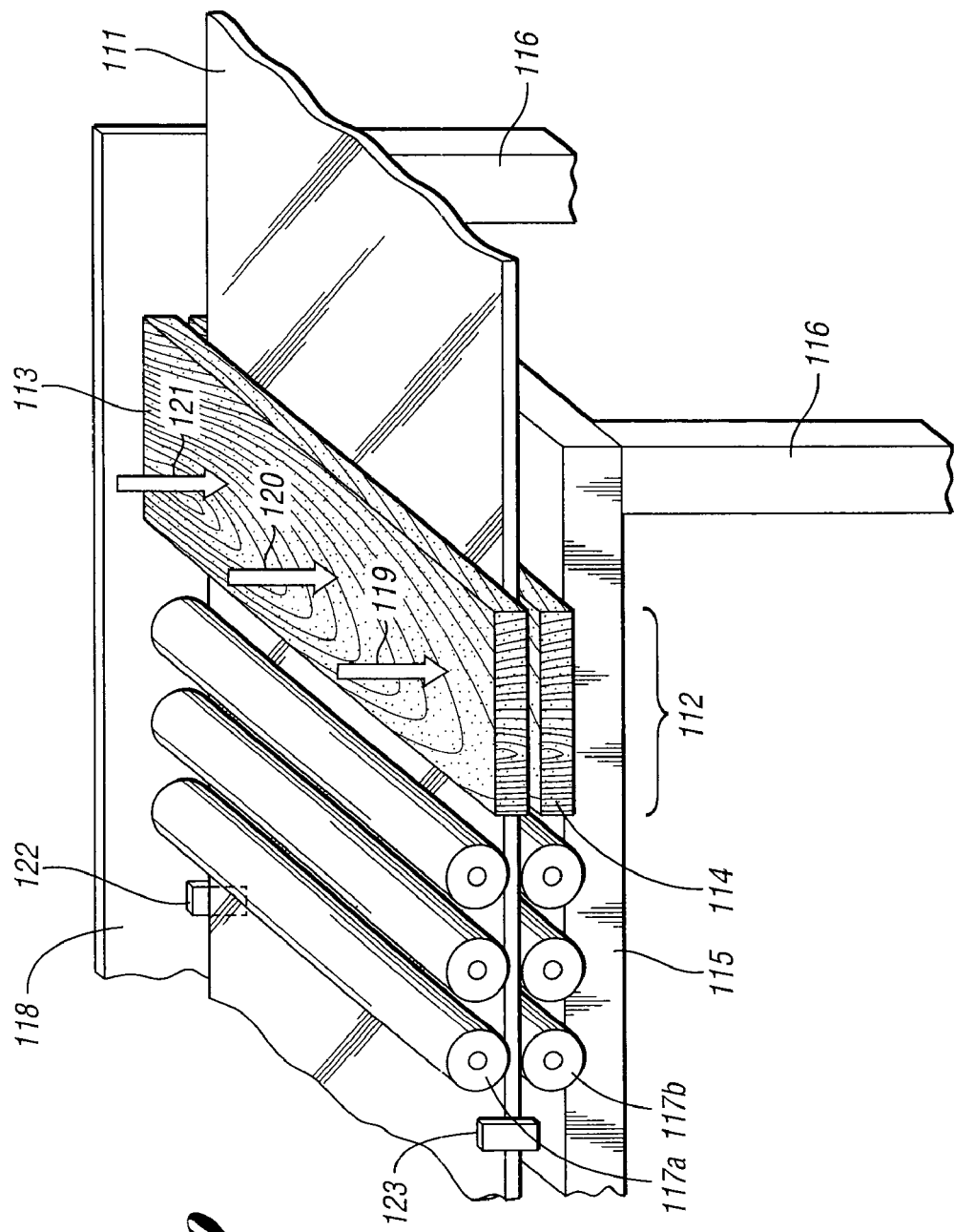
FIG. 10 illustrates an embodiment of a back pressure device of the subject invention.

One example of a back pressure device is shown in FIG. 10 in perspective. The die is not shown for clarity. The UHMWPE sheet 111 has exited the die (not shown, to the right) at a temperature below the crystalline melt temperature. The back pressure device 112 consists of two platens in the form of sheets 113, 114 of wood or plywood, the upper platen 113 for example, of 0.5 inch (12.5 mm) thickness. The lower plywood sheet, which is preferably of 1.0 inch (2.5 cm) thickness or of greater thickness, is maintained in position by fastening to a support structure 115 supported by legs 116. The support structure may be any convenient structure having the necessary rigidity, for example, a structure made of aluminum or steel channel, etc. Following the back pressure device in a preferred embodiment, are a series of freely rotating roll pairs 117a, 117b which may be made of any suitable material, for example, mild steel, stainless steel, or aluminum, and which are suitably positioned above and below the UHMWPE panel, for example, by a pair of side rails. One side rail 118 is shown, the front rail being deleted for purposes of clarity. The ends of the rolls may have pins located in sockets in the support rails, may be constrained within ball bearing races, etc. The roll pairs may be located such that they lightly bear against the panel; may, particularly if solid, rest on the UHMWPE panel, or may be adjusted in position to just contact or to avoid contact by a narrow space, for example, but not by way of limitation, 0.010 inch (0.25 mm) or 0.005 inch (1.25 mm). The purpose of the roll pairs is to assist in maintaining panel flatness as the panel cools further, not to alter back pressure, although if they bear against the panel and are restrained in movement, they may assist in this function as well. The rolls are advantageously 1.0 inch to 4.0 inches (2.5 to 10.2 cm) in diameter, more preferably 1.5 inch to 4 inches (3.8 to 10.2 cm) in diameter, and are preferably relatively closely spaced in the machine direction; e.g., at a spacing of 0.10 to 3.0 inches (2.5 mm to 7.5 cm) (circumference to circumference), preferably 0.2 (5 mm) to 2.5 inch (6.4 cm) apart. As indicated previously, the roll pairs are optional, and can in fact be used with back pressure devices other than those having a plurality of pressure elements, and can be used alone as well.

Other methods of vertically restraining movement of the panel and/or portions thereof may be used instead of a plurality of roll pairs. For example, a double belt press may bear lightly against the panels and be configured such that rotation is in sync with the incremental extrusion of the panel, or may be driven by panel movement itself. Likewise, one or more panels such as those used as back pressure elements, preferably cloth or felt covered, or made of or covered with lubricious material, may be fixed permanently in position just touching the panel, or adjustable to such a position, such that minimal restraint is exerted against the panels, while vertical movement of the panel is substantially prevented. The panels, bars, or other devices may be positioned parallel the machine direction or transverse thereto. Other means of accomplishing the same result can now readily suggest themselves to the skilled artisan.

Arrows 119, 120, and 121 illustrate points at which pressure is applied to the back pressure device, preferably by hydraulic or pneumatic cylinders positioned above the back pressure platen 113. While three points of pressure are shown, two pressure points, for example 119 and 121 may be used, or a higher plurality, i.e., four, five or six, generally less than ten, pressure points may be used. Pressure may also be applied from the bottom, i.e., to bottom platen 114, or to both platens 113 and 114.

UHMWPE when heated above 180° F. (82° C.) begins to lose strength, and become less rigid. Due to the extreme width to thickness ratio of wide panels of the material, when exiting the die above 200° F. (93° C.) the material will move at different rates along the width. This causes tearing, and humping. Several factors contribute to these observations, including die cleanliness at start up and which remains in a state of flux, pinch point condition, die plate flex, die plate condition, and hang up. Multiple post extrusion pressure zones allow different sections of the sheet product to be adjusted according to the observed condition. Areas wanting to hump may have additional pressure applied to them, while areas that tear will have their pressure reduced. Surface quality may thus be improved.

Bow, both horizontal and vertical, is caused due to stress and uneven heating and or cooling of the material. Post extrusion pressure zones may be used to counter uneven slip and drag in the tool that cause stress. The multiple zone configuration allows adjustments to be made in localized areas of the sheet, depending on the direction and type of bow. Basically, the pressure zones are used to even the flow of material, across the width, as it exits the tool.

In operation, the operator observes the flatness or other product characteristic of the panel as it travels between the roll pairs, or after exiting the roll pairs, for example prior to or after cutting to length. In one embodiment, side position sensors 122, 123 may be installed to detect sidewards motion. If the sheet begins to exert pressure on sensor 122, for example, this is a sign that the opposing side may be moving through the tool and exiting at a higher output rate, or may have inadequate contact with the die and is cooling too slowly and shrinking differentially. Accordingly, greater pressure would be exerted on pressure point 119, or lesser pressure on pressure points 120, 121. Likewise, thickness measurements indicating a thinner panel on the left side (left when facing the die exit) imply slower cooling, greater crystallinity, and correspondingly greater shrinkage has occurred as compared to other points. This may indicate inadequate contact of the right side of the panel with the die, allowing slower crystallization due to loss of contact with the cool die proximate the exit. Increasing back pressure on the right side by applying greater pressure at pressure point 119 is warranted. In summary, the vertical pressures on various zones of the back pressure device transverse to the machine direction are adjusted to maximize flatness and dimensional stability. This cannot ordinarily be accomplished by a single back pressure zone; a plurality of zones is required, although once stable operation is attained, it is not unusual that little, if any further change, be made to the back pressure device, even for long runs. However, the pressure settings may vary from run to run, and will vary most between start up and stable operation.

In like manner, if the thickness specification is ±0.020 inch (0.51 mm), the panels have not exceeded ±0.010 inch (0.25 mm), but suddenly or gradually tend towards greater variations in thickness, for example one side or a central portion increasing in thickness such that continued increase over time will exceed the ±0.020 inch (0.51 mm) thickness specification, then the back pressure device is adjusted over a portion of the width of the panel to discontinue this trend, or to reverse it.

The same device can be used to run materials other than UHMWPE, as well as UHMWPE with differing additive packages, and may be adjusted accordingly depending on the pressure requirements for each particular material. For example, other polymers which are gel-like above their crystalline melt temperature, such as PTFE, can be employed.

In addition to providing differentially adjustable back pressure across the width of an extruded panel, the back pressure devices of the subject invention can also be uniformly actuated or subject to the same increase or decrease in pressure across the width when the pressure in the die is in need of adjustment. In a slit die of large width, under ram extrusion conditions, large internal pressure are generated. The geometry of the die takes into account the deflection which will occur at the expected operating pressure such that a flat panel is the extruded product. If the pressure in the die is reduced, for example by a change in internal temperature or batch-to-batch resin variation, the height of the die, particularly at its mid-section, will decrease. The result will be a panel which is thinner in the middle than at the edges. Likewise, an increase in pressure will cause the die to distort more than planned, and the panel product will now be thicker at the middle than at the edges. Increasing the pressure on the back pressure fixture elements will increase the internal pressure in the die and vice versa, and thus monitoring the relative thickness of the central area of the panel with the edge thickness will alert the operator or control device as to when a global increase or decrease in back pressure is mandated to keep product within specification and preferably to optimum thickness variation. Thus, by varying the back pressure on the panel exiting the die, the die geometry is altered by a corresponding change in internal pressure. However, such adjustments are not reliably repeatable, and thus this aspect is generally used only for relatively coarse adjustment.

Wood back pressure devices, such as those of FIG. 10 (113, 114), are generally coated with soft fabric, woven or non-woven, to minimize scratching of the UHMWPE panel surface. The panels may also be faced with soft plastic, but this is less desirable, as such facings may acquire grit embedded into the surface, causing scratching. While fabrics and felts may also suffer from this problem, they are easily and inexpensively changed.

A potential disadvantage of the back pressure device of FIG. 10 is that the back pressure across the back pressure device is not truly independent, since the pressure exerted, for example, at pressure point 120 will also be exerted in part at points 119 and 121. The more rigid the sheets 113 and 114, the less independent the pressure adjustment, and thus in this embodiment, the sheets which make up the back pressure device are preferably relatively thin, or are scored to be flexible across their width, i.e., flexible transverse to the machine direction, by scoring parallel to the machine direction, through the use of linking devices or hinges, etc.

Figure 11A:
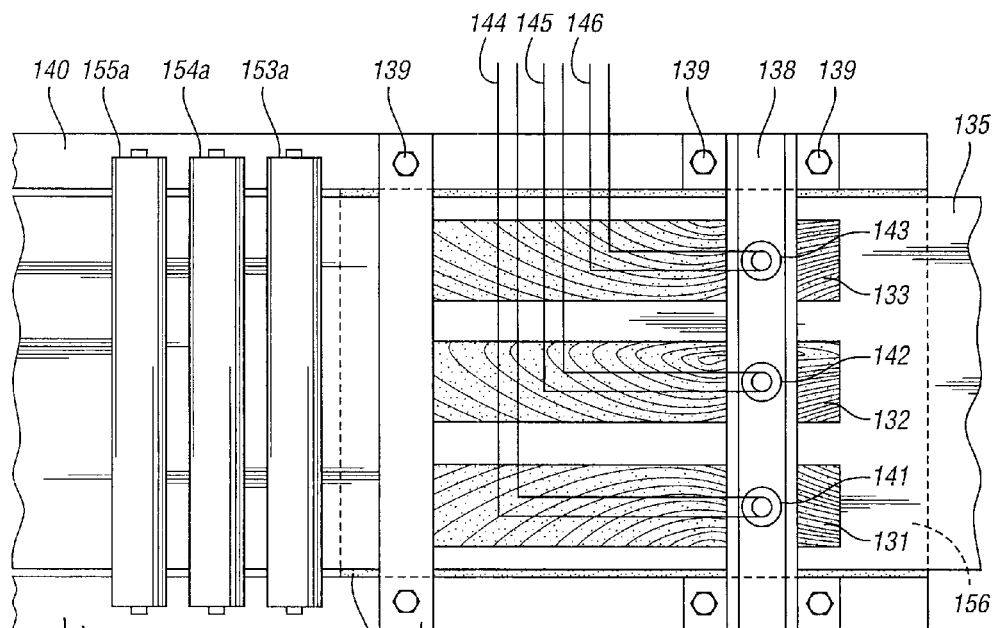
FIGS. 11a, 11b, and 11c illustrate further embodiments of a back pressure device of the subject invention.
Figure 11B:
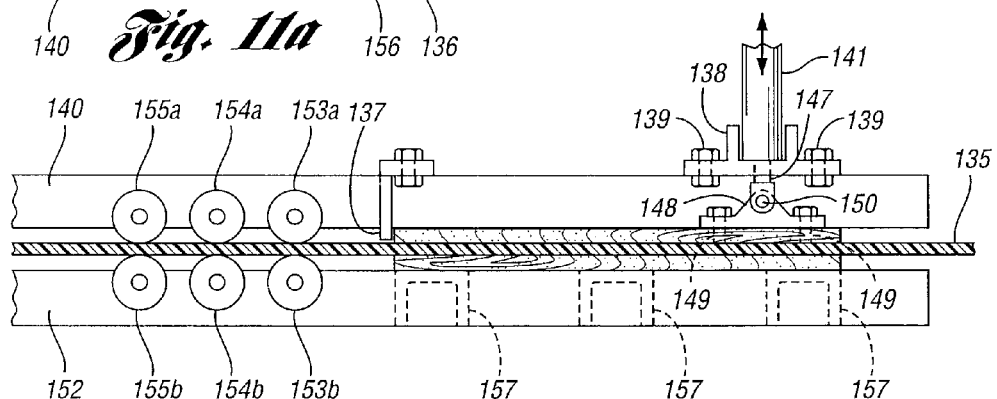
Figure 11C:
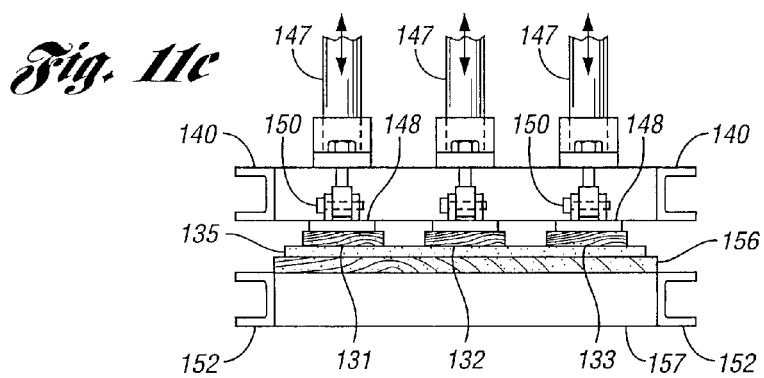

A more preferred embodiment of a back pressure device is illustrated by FIGS. 11a, 11b, and 11c. In FIG. 11, the back pressure device is formed of three upper pressure platens 131, 132, 133 of 0.75 inch (19 mm) thick wood or plywood. The back edges in the machine direction are prevented from drifting downstream with the ram extruded UHMWPE panel 135 by end restraint 136 which has a downwardly extending lip 137. Located above the upper pressure platens proximate their upstream ends is pressure actuator support 138. Both the end restraint 136 and pressure actuator support 138 are fastened to C-channel rails 140 by fasteners 139. Positioned above each upper pressure platen (131, 132, 133) is a pressure actuator, here, respective pneumatic cylinders 141, 142, 143 which are fed pressured gas by supply lines 144, 145, 146. The shaft, or plungers of the pneumatic cylinders are attached to the pressure platens by any convenient method. As shown in FIG. 11b, a side view of the back pressure device and associated equipment, shaft 147 is attached to platen 131 by means of bracket 148 and pin 150. Bracket 148 is attached to platen 131 by screw fasteners 149. Devices such as bladders, independently driven wheels, flexible plates deflected by servo, stepping devices or thermal expansion devices may be used in place of pressure cylinders to actuate the back pressure device. Substantially any device which allows for variation of pressure applied to the back pressure elements is suitable.

Mounted below the passageway for the UHMWPE panel on lower frame rails 152 is the single (in this embodiment) lower platen 156 which is firmly attached to frame rails 140 and 152, and supported by crossmembers 157 to provide rigidity. The UHMWPE panel 135 passes between upper pressure platens 131, 132, 133 and lower platen 156. The upper platens, lower platen, and pressure actuators, with their necessary supports and locating devices, etc., form the back pressure device.

Following the back pressure device are vertical movement restraining roll pairs 153a,b, 154a,b, 155a,b, as shown in FIGS. 11a, 11b. These roll pairs are journaled into the upper and lower frame rails 140 and 152, and are sized and positioned so as to just contact the UHMWPE panel 135. While three roll pairs are illustrated, it is desirable to have twenty or more roll pairs. The roll pairs serve a dual function of removing heat in a relatively uniform manner while also maintaining flatness of the panel. In this manner, the roll pairs, while preferably employed together with back pressure devices having independently adjustable pressured zones, can also be used together with a back pressure device having but a single pressure zone, although this is not preferred. Between channels 140, 152 are spacer strips or blocks to sandwich the wood lower platen between the rails. Alternatively, the lower platens may be fastened to crossmembers 157 or otherwise supported, e.g. by a welded-in frame, etc. The apparatus illustrated in FIG. 11 can be constructed in numerous ways and out of numerous materials, by one skilled in the machine and fixture construction arts.

A similar embodiment to FIG. 11 which is less preferred, employs multiple lower "platens" below the extruded panel, thus taking the place of single platen 156. The platens are preferably made of wood material in all the embodiments due to its low cost and excellent thermal properties. Wood products which exhibit minimal distortion are preferable, for example layered wood products such as plywood. Solid wood products are desirably stable species such as mahogany. Layered wood products having reinforcing layers or facings such as resin matrix woven or non-woven fiberglass or carbon fiber are also useful. If made of thermally conductive materials, it is desirable that the platens have either a high thermal mass (inertia) or contain insulative layers, or both, to minimize temperature fluctuations and maximize heat retention.

For the extrusion of a single panel, the amount of downwards pressure exerted against the panel, which retards movement of the panel ("restraining force or friction") and thus gives rise to back pressure, depends upon the thickness of the panel being extruded and its width. The pressure preferably should not cause the panel to bow or bend between the exit die and the back pressure device, and thus for panels of a fixed width, the thinner the panel, the less back pressure can be tolerated, and the pressure applied to the extruded panel in a vertical direction, i.e., the "restraining pressure," is less than for a thicker panel of the same width. These considerations, together with the desirability of maintaining contact of the panel with the walls of the die at least in the cooling zone, limit the minimal thickness of the extruded sheet to approximately 3-4 mm in thickness, and preferably 5-6 mm, assuming a width of 0.4 to 0.5 m.

The minimum width of the panels is about 0.4 m, more preferably 0.5 m, and yet more preferably at least 0.6 m, with widths of 1.0 m to 1.3 m preferred. The maximum width is limited only by the ability to manufacture a suitable die, and for practical reasons is generally less than 3 m, and more preferably about 1.5 m (5 ft) or less.

The aspect ratio of the panels is also important. The minimum aspect ratio (width divided by thickness) for panels above 0.6 m in width is preferably about 20, more preferably above 40, yet more preferably above 60, and desirably above 80, for example 100-250. As one example, a 1.2 m wide panel with a thickness of 1 cm will have an aspect ratio of 120. At lower aspect ratios than 20, it may be difficult to apply sufficient back pressure by the means described heretofore, without affecting the surface finish of the panel. For smaller panels, i.e. in the range of 0.4 to 0.6 m in width, an aspect ratio greater than 10 is preferable, more preferably greater than 20, yet more preferably greater than 40, and still more preferably greater than 60. Aspect ratios greater than 100 are particularly preferred.

Thus, in one embodiment, the invention is directed to a back pressure device having differential pressure zones for use with UHMWPE panels ram extruded through a die having a substantially rectangular cross section under operating pressure and having a multiplicity of transverse cooling zones proximate the exit face of the die, wherein the panel has a surface temperature below the crystalline melt temperature upon exit from the die. The invention is also directed to the use of a plurality of vertically confining roll pairs or other vertical restraints downstream from a back pressure device, even one without a plurality of differential pressure zones, which confine the panel dimensionally until the temperature of the panel is in the range of ambient to 85° C., more preferably ambient to 50° C., yet more preferably ambient to 43° C. and still more preferably, to a temperature within the range of 32 to 37° C. While the lowest preferred temperature is the ambient temperature, it would not depart from the spirit of the invention to cool the panel below ambient.

It should be noted that the back pressure generating elements which are differentially adjustable may individually be set at zero or substantially zero pressure. Thus, some back pressure elements may only lightly contact the panel, while others may exert considerable pressure. It should also be noted that the difference in pressure is not required to be totally independent, as also explained elsewhere. All that is required is that a difference in pressure between at least two and preferably all back pressure generating elements may be established.

The side guide devices are located on both sides of the panel exiting the die, preferably in the neighborhood of the back pressure fixture. The side guides may constitute a pin or bar positioned vertically, whose sides bear against the panel. However, to avoid any impression on the edges of the panel by the side guides, the latter are preferably in the form of a horizontal bar or channel, preferably one of wood, cloth covered wood, or lubricious plastic, for example a UHMWPE or nylon-faced metal channel.

Reference may be had to FIGS. 13a and 13b which illustrate side guides. For simplicity, the framework and other details have been omitted. The side guides may also be linked to a side pressure measuring gauge which senses sidewards pressure of the panel, and causes pressure on the proper edge of the panel to be increased to counter the panel's attempt to escape parallelism with the machine direction. In other words, the panel ideally exits the machine straight, i.e. with the edges (and hence also the center, etc.) of the panel parallel to a line in the machine direction. However, differences in cooling and/or crystallization rates or other factors such as non-uniform pressure across the panel exerted by back pressure elements may cause the panel to attempt to move sideways. The side guides and sensors associated therewith are used to counteract this tendency against parallelism, should it occur. Since this sideways panel movement is most likely to occur at the back pressure device, it is preferably that the side guides are located at the back pressure device location, or immediately following the back pressure device.

The back pressure fixture of FIGS. 13a and 13b consist of a lower board or platen 151 and three upper platens 152, 153, 154. Pressure is applied through means of the platens to UHMWPE panel 155 by pneumatic cylinders 156, 157, and 158 which bear, respectively, against platens 152, 153 and 154. There are 12 pneumatic cylinders in all, two on the left side of each platen, as shown in FIG. 13a as 156a, 156b, and two on the right side. The cylinder rods are attached to the platens by brackets 159 and clevis pins 160.

The side guide devices 161 consist, as illustrated in FIG. 13b, of a lubricious thermoplastic bearing surface 162 which is bonded or otherwise attached to metal channel 163. Pneumatic cylinder 164 applies pressure through cylinder rod 165 which is secured to metal channel 163 by bracket 166 and clevis pin 167. Other fastening means are also suitable, and other pressure arrangements. Two such devices are shown in FIG. 13b, one on each side of the panel 155.

The side guides are shown in FIG. 13a from the side. In this case, two side guides are used on each side of the panel, in order that greater sideways pressure can be applied.

The restraining of movement of the panel away from the die is most preferably a frictional restraint. This frictional restraint may be a sliding friction where there is relative movement between the UHMWPE panel and the surface of the back pressure devices, for example, those illustrated by FIGS. 10 and 11, or may be a restraint which does not allow for sliding friction. Examples of the latter are elastomer coated rollers which rotate in a restrained manner, but grip the panel surface in a non-sliding manner, or a double band press as described below.

An embodiment with a double band press is illustrated in FIG. 12. Traditionally, double band presses are employed to consolidate materials such as thermoplastic matrix, fiber-reinforced semi-finished products by applying a consolidating pressure, and often heat as well. In the present invention, a rather simple form of double band press may be used as a vertical restraining means following a back pressure device, or as illustrated by FIG. 12, may also serve as the back pressure device itself. In the former case, the bands or belts of the "press" bear against the UHMWPE panel, and are not necessarily driven, the frictional contact with the sheet providing the driving force for the bands and the rolls supporting them. In the latter case, the bands are driven synchronously but delayed with respect to movement of the ram of the ram extruder such that a back pressure is created between the double band press and the die.

In FIG. 12, the double band press 170 is constructed with two continuous bands or belts 171, 172 which bear against UHMWPE panel 173 extruded from ram extrusion die 174 (also refer to FIG. 1). Located above the lower portion of the top band are platens 175, 176, 177, 178, and located below the upper portion of the lower band are platens 179, 180, 181, 182. These platens may be adjusted to bear the bands against the panel from an essentially pressureless contact to a relatively high pressure. Due to the incompressibility and relatively high strength of the panel, a quite low pressure, due to the large surface area of the bands, will prevent movement of the panel except when such movement is desired.

The platens may also be heated or cooled. Since the travel of the panel is relatively slow, the panel can spend a considerable time within the press. Thus, for example, the beginning of the press can be heated to the crystalline melt temperature and maintained at this temperature or slightly above or below to anneal the panel or promote additional crystallization of the UHMWPE. Care must be taken to ensure temperature uniformity in such cases.

The press in this embodiment is driven by electrical motors or other means (not shown) in an incremental fashion synchronously but delayed from the travel of the extrusion ram 184. Thus, as the panel attempts to exit the die, it will experience a considerable initial pressure between the press and the die since the press at this point is stationary. If the press remained stationary, the panel would greatly distort. However, the driving means is tied to the movement of the ram by feedback loop 185, and the driving motors on/off cycle and speed during their on condition are regulated by a conventional process controller or PLA 186. The start of movement of the bands may be delayed by from 0.01 to 0.10 second, for example. The normal delay in beginning rotation of the press may provide this delay.

In a general aspect, the present invention is directed to a process of ram extrusion of UHMWPE panels having a width in excess of 0.4 m, more preferably >0.6 m, and yet more preferably in the range of 1.0 to about 1.5 m, comprising the steps of:

ram extruding an UHMWPE panel through a slit die wherein the temperature of the panel exiting the die is below the crystalline melt temperature, the die preferably having a multiplicity of transverse cooling zones located proximate the exit face of the die;

restraining movement of the panel away from the die such that a back pressure is created, a back pressure device preferably having a plurality of back pressure zones positioned transverse to the machine direction, and adjustable relative to other back pressure zones;

optionally, guiding the panel's horizontal movement transverse to the machine direction;

monitoring at least one characteristic of the panel which has a defined product specification value;

determining when the at least one characteristic is outside the product specification value or is exhibiting a change in the characteristic away from a desired value of said characteristic; and adjusting the back pressure differentials or the temperatures of the cooling zones or both along the width of the panel to bring the at least one characteristic within the product specification or to counteract the change in the characteristic away from a desired value of the characteristic. The characteristics which are most important are panel flatness, thickness uniformity, and surface quality.

It is an object of the present invention, therefore, to provide a stable process. By a stable process is meant a process where long runs of product, runs lasting, for example for minimally 8 hours (1 operating shift), to several days, or to weeks or even months, without producing significant amounts of off-spec products. In a typical 3-7 day run, for example, a scrap rate of less than 10%, preferably less than 5% would be expected. The stability of the process is achieved either automatically under suitable process control, or by an operator. It has been found that operator training is rapidly accomplished.

The product produced by the inventive process is a novel product whose manufacture was not possible prior to the present invention. As indicated previously, due to the difficulties of ram extrusion, it had been impossible to ram extrude constant thickness panels of large width and high aspect ratio, i.e. thin panels. Thus, to produce thin panels, thick, compression molded panels were skived to produce thin sheets. However, these sheets have irregular surfaces, both in terms of thickness variation as well as appearance.

The UHMWPE panels produced by the subject process are, in general, superior to products of similar dimensions which are produced by compression molding of large, thick blocks followed by skiving. Noteworthy among the superior characteristics are a more uniform thickness, freedom from edge curl and end curl, and a smooth glossy finish. The surface normally is characterized by parallel shot marks which are difficult to observe except at oblique angles. Each product which is commercially acceptable must meet product specifications, which may constitute a minimum value of a particular characteristic, a maximum value, or a range of values. For example, a nominally 1.0 m wide sheet may have a width tolerance of ±0.5 mm; or −0 mm, ±0.5 mm, etc., Likewise, thickness variations may be expressed by ranges such as ±0.050 inch, ±0.020 inch, −0, +0.30 inch. etc. Edge curl may be set to a distance from the edge towards the center of the width of the sheet where edge curl is absent, i.e., up to 1 cm, up to 2 cm, etc. Similarly, warp, bow, and end curl may have values set for them.

The foregoing product specification values are generally set by the manufacturer, the distributor, or the end user. Regardless of who determines what product characteristics are necessary, the manufacturer must adjust the process in order to meet these specifications. All these product characteristics are easily measured by methods well known in the art. Edge straightness, for example, can be measured by abutting the edge of a sheet against a reference flat surface and noting departures from contact. Thickness may be measured by feel gauges, by profilometry, optical interferometry, etc. Many of these measurements can be made following the cutting of extruded panels to size, employing a statistical sampling regime. Other measurements can be made on line on the moving panel, especially thickness variations, and any tendency for the panels to "walk." Some characteristics, such as warp, bow, and walking will be evident to the machine operator, who will then make the necessary adjustments in back pressure and/or cooling zone temperatures to restore the characteristic to its desired value. For example, a panel which is tending to walk towards the left can, following adjustment, be made to exit the die and continue downstream in a linear fashion by suitable adjustment of back pressure on a portion of the panel relative to other portions. A panel which has not "walked" and thus whose sides are at right angles to its length, is said to be "orthogonal", and the measurement of "walking" may be described in terms of "panel orthogonality". The edge of a panel which has walked and is thus not orthogonal will exhibit a curved edge when compared to a straight reference surface. In very unstable processes, S-shaped curves where walking fluctuates between left and right directions may also occur. The side guides described herein may also assist in preventing "walking".

The smoothness can be assessed easily by touch, and the gloss of the surface assessed visually, or by optical inspection techniques such as the standard ASTM D2457-03 and D523-89 test methods, preferably at a 60° angle. Using this test methodology, employing a BYK Gardner Color Guide Glass Meter supplied by BYK Gardner U.S.A., Columbia, Md. and a 60° test angle, average gloss measurements preferably range from 35 upwards, with most panels in the range of 35 to 45. This is in contrast to skived panels which, although also smooth, have significantly lower gloss, averaging about 24 using the same test methodology.

The uniform surface has a 3σ thickness variation of less than ±0.050 inch (±1.25 mm), more preferably within ±0.030 inch (±0.76 mm), and yet more preferably within ±0.020 inch (±0.50 mm) While the surface is smooth and glossy, it can further be distinguished from skived panels by the presence of shot marks substantially perpendicular to the length of the sheet (in the machine direction) and substantially parallel to each other. These shot marks are believed to be caused by the stationary dwell between ram extrusion cycles, and the profile and height of the shot marks can be measured by standard profilometry techniques. The shot marks have a maximum height (top to bottom) of only several microns, i.e. less than 70 μm, more preferably less than 25 μm, and importantly, do not interfere with known uses of thin panel stock. Products have been produced over extended trials with shot marks measuring about 5-10 μm in height. The shot marks may easily be seen by observing the panel at an oblique angle.

Figure 14A:
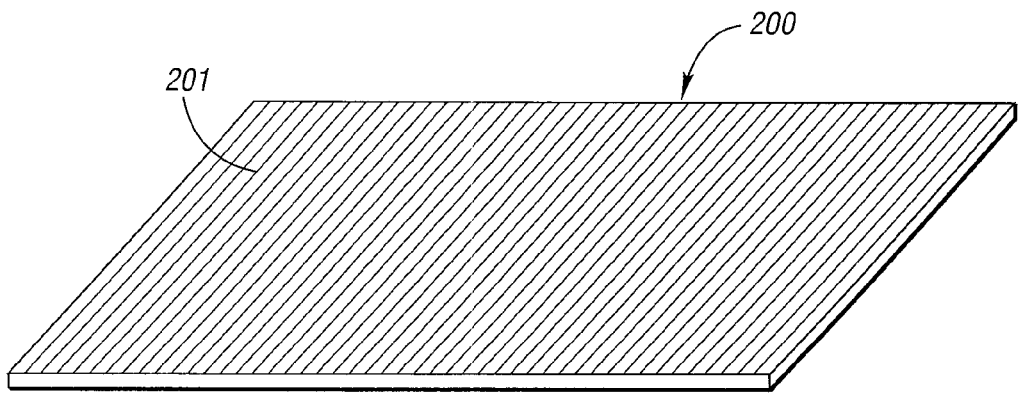
FIGS. 14a-14c illustrate three variations of the shot marks which might be observed in the UHMWPE panels of the invention.
Figure 14B:
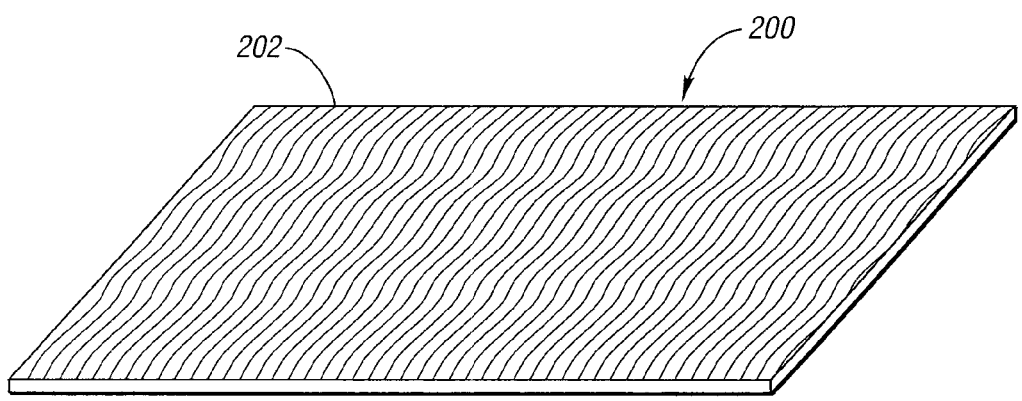
Figure 14C:
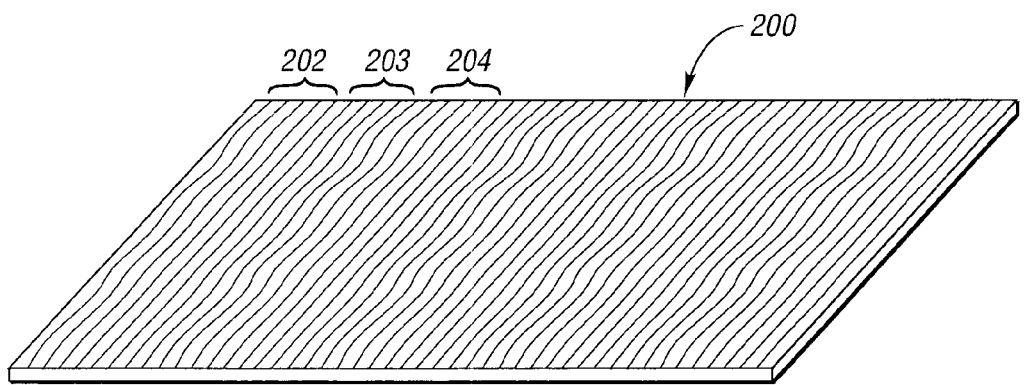

FIGS. 14a-14c illustrates several shot mark patterns. In FIG. 14a, an "ideal" shot mark pattern is shown, where the delimiting edges 201 of shot marks are exactly parallel to each other and perpendicular to the machine direction in panel 200. This type of pattern would result if the UHMWPE in the die all flowed at exactly the same rate, experienced the same back pressure, etc., and these parameters did not change over the length of the panel.

However, the flow of UHMWPE is generally retarded somewhat at the edges of the die, and may experience less retardation at the die center. The retardation at the two edges may not be the same either. The result is that the shot marks are typically somewhat "wavy" or "undulating" across the panel surfaces (shot marks are on both front and back surfaces) as shown at 202 in FIG. 14b. The generally perpendicular orientation to the machine direction is clear, as is also the generally parallel orientation with respect to adjacent shot marks. In FIG. 14c is shown a similar panel but one in which the shot marks change their respective orientation along the panel, initially at 202 being the same as in FIG. 14b, departing somewhat over portion 203, and becoming similar again over portion 204. The shot marks are still substantially perpendicular to the machine direction and substantially parallel to each other.

Thus, the present invention also pertains to an UHMWPE panel having a width greater than 0.4 m, and characterized by generally parallel shot marks on both top and bottom surfaces. For panels whose length direction corresponds to the machine direction, these shot marks are across the width of the panel, i.e. transverse to the machine direction. The surface of the panels are smooth and glossy, and have a thickness tolerance as previously described. Preferred panels are from 4 mm to 10 cm in thickness, more preferably less than 2 cm thick. Preferred panels have a global flatness variation of less than 0.150 inch (3.8 mm; 3σ) with a tolerance of ±0.030 inch (0.8 mm; 3σ), and preferably a global flatness variation of less than 0.100 inch (2.5 mm) with a tolerance of less than ±0.024 inch (0.6 mm; 3σ). The sideways bow (curvature) of the panels, without trimming, is preferably within approximately the same values as the global flatness. It should be noted that these sideways bow tolerances for the panel as extruded, are superior than that which is ordinarily obtained by conventional sawing of the edge. Thus, it is preferred that the subject invention panels retain their edges "as produced", and are not sawn.

Having generally described this invention, a further understanding can be obtained by reference to certain specific examples which are provided herein for purposes of illustration only and are not intended to be limiting unless otherwise specified.

Example 1

A ram extrusion machine is provided having a stainless steel die composed of two halves, substantially as described herein, as illustrated, for example, by FIGS. 2, 3, and 4. The die has a length in the machine direction of 81.25 cm, a width of 172 cm, and a height of 96.5 cm. The bottom die half is similar to the top half but does not contain any passageways 147 for entry of UHMWPE powder, and has edges configured to mate with those of the top half. The die is vertically tapered in the machine direction from the ram entry by about 3°, and the geometry of the slit is generally circular with a very long radius, ca. 375 m. The hot zone of the die is maintained at 440° F. ±20° F. (227° C. ±11° C.), and the die exit end is provided with five cooling zones on each die half, extending approximately 3 inches (7.6 cm) into the die in the machine direction.

The die is contained within a support structure consisting of two flat surfaced carbon steel billets measuring 68 in. (1.7 m) by 15 in. (0.38 m) by 22.5 in. (0.58 m), which are tensioned by 5 multi-jackbolt tensioners having a bolt diameter of 2 in. (5 cm). The steel billets are positioned over the die about one inch from the exit end and extending from that point toward the ram entry end of the die, as illustrated in FIG. 2.

UHMWPE resin powder 6540 from Braskem, Sao Paulo, Brazil, having a melt temperature of 133° C., an average particle size (D50) of 190 μm, and an average molecular weight of 8×10⁶ g/mol is introduced pneumatically into a hopper above the UHMWPE entry ports in the top die half. A flow of nitrogen is introduced into the hopper near the bottom to remove air from the resin powder. The ram is drawn back and resin powder is allowed to fill the die cavity below the hopper. The ram then enters the die and compresses the resin powder and pushes it into the vertically tapered portion of the die, this resin in turn pushing the previous portion of resin powder, which has now been heated to a gel, towards the die exit. The ram dwells at this position for approximately 1 second, and then the cycle is repeated. At the beginning of each cycle, once the die is full, 0.5 inch (12.5 mm) of length of an UHMWPE panel of 0.375 inch (9 5 mm) thickness and width of 4 feet (1.22 m) exits the die. The panel is partially restrained in movement by a cloth covered back pressure device which facilitates continued contact of the cool (250° F.) panel with the walls of the die. The back pressure device is constructed so as to allow for variations in back pressure across the width of the panel. The panel is taken up on a flat conveyor, and the operator adjusts the cooling zone temperatures to remove warp and bow from the panel. The top and bottom cooling zone temperatures at stable, flat panel production, are [42° C., 56° C., 60° C., 49° C., 43° C.] and [42° C., 49° C., 53° C., 44° C., 41° C.] respectively. The panel exits the die at a temperature below 100° C., much lower than the crystalline melt temperature. The flat panels produced are cut to length, and have a glossy flat surface with a thickness variation of less than 0.030 inch. Mold "shot marks" of a length equivalent to each ram stroke's production can be seen if observed carefully at a high angle of incidence, but are virtually invisible when viewed head on. The panel has slightly rounded edges which are uniform from panel to panel, and is of commercial quality.

Example 2

The same machine and process are used as in Example 1, but the die has in addition to the vertical taper, non-parallel exit faces having dual side tapers and a curvilinear top section, as described in FIG. 7. The top cooling zones are all set to 76.7° C. and the bottom zones all set to 73.9° F. Very little adjustment is required during operation. The extruded panel exits the die at approximately 79° C. A flat panel of even higher quality than Example 1 in terms of thickness variation and edge consistency is produced. The production rate is 5.8 m/hour (19 feet/hr, or 71.4 kg/hour (160 lb/hr).

Comparative Example 1

A commercial press molding operation is employed, employing a large, thick section coffin-like mold. UHWMPE resin powder is introduced into the mold cavity and a close fitting top inserted into the mold. The mold and three other molds of similar size are loaded into a stack, placed under a pressure of 1000 lb/in$^2$, (6.9 MPa) and heated to above the crystalline melt temperature, held at this temperature for 90 minutes, and then slowly allowed to cool. Thick plaques are obtained from which 0.375 inch (0.95 cm) thick panels can be produced by skiving in a separate step. Prior to skiving, the production rate is 75 lbs/hour (33.5 Kg/hr). Following skiving, a long anneal time at elevated temperature is required to reduce end curl and edge curl and internal stresses.

Example 3

A panel of UHMWPE of a nominal ⅜ inch (9.525 mm) thickness and a width of about 1.2 m is ram extruded, as described in Example 2, from a die having a heated zone maintained at about 420° F. (215° C.) followed, in the machine direction, by a plurality of cooling zones, such that a flat sheet having a thickness tolerance of ±0.030 inch can be produced during stable operation. The sheet exits the die at a temperature of about 150° F. (65.6° C.), below the crystalline melt temperature.

The start-up temperatures are at a target temperature of 345° F. (174° C.). The hopper is filled with UHMWPE resin powder having a number average molecular weight of about 4×10$^6$ Da, and purged with nitrogen. The ram, having a thrust of 2 inches (5 cm) is cycled at the required interval. As the material exits the die, it begins to warp and deform. Concurrently, it also bows hard to the left. To counter this distortion, a back pressure fixture is applied to the panel to regain and maintain control.

The fixture consists of a bottom, cloth covered, rigid, flat surface back pressure fixture of plywood, positioned below the panel. Below the bottom back pressure fixture is a table supported from the floor. The table height is adjusted such that the top surface of the bottom brake fixture is close to the same level as the bottom of the slit die opening. Three fixtures are constructed of rigid plywood covered with cloth, and placed on the top of the panel. The fixtures each measure 42" (1.07 m) in length and 16¾" (42.5 cm) wide, and cover the first 42" (1.07 m) of panel across substantially the entire width. The top three fixtures are then pressed down against the panel with four pneumatic cylinders each, two cylinders on the left side of each fixture, and two on the right, with the two on each side tied together and actuated utilizing the same valving and regulator system. This combination gives the ability to adjust each top brake fixture on both its left and right sides, thereby creating six zones of pressure control across the width of the part. The air cylinders are three inches in diameter, and can be regulated from 0 PSIG to 100 PSIG (0 bar to 6.9 bar gauge). The cylinders are evenly spaced an approximately 26" (66 cm) apart in the machine direction. On each side of the panel is a side guide device to keep the panel from moving out from underneath the back pressure fixturing. These are actuated and controlled by similar valving, regulators, and cylinders as the top fixture, and are also made of plywood.

The top fixtures are placed on the panel, and the regulators set at 10 PSIG (0.69 bar gauge) to stop the warping. Once the fixture is pressurized, the sheet begins to flatten, but still bows to the left. Most of the warped areas are trimmed off, and the side of the panel is trimmed back so the edges of the panel are inside the side guide area. The side guides are then actuated at 20 PSIG (1.38 bar gauge), effectively encapsulating the panel. As the panel moves forward out of the brake fixture, it is guided between rollers guides for further control. The top rollers are initially raised 8"-10" (20 cm-25 cm) above the bottom rollers to allow any sheet with warpage to easily pass through. Once completely through the roller guides, the top rollers are lowered down onto the sheet. The roller guides are provided over a length of 20' (6 m) and are furnished in pairs, one roller above and one below the panel. The rollers are 3" (7.5 cm) in diameter, and spaced approximately 5" (1.25 cm) apart, center to center.

Once reasonably stabilized, the sheet is observed to have warping/raised areas on the right side of the sheet. The back pressure zones are then adjusted by raising the air pressure to the pneumatic cylinders to 40, 40, 45, 50, 60, and 75 PSIG from left to right (2.8, 2.8, 3.1, 3.4, 4.1, 5.2 bar gauge). This decreases, but does not completely stop the warping, so the back pressure fixture is re-adjusted to 40, 40, 45, 50, 75, 85 PSIG (2.8, 2.8, 3.1, 3.4, 5.2, 5.9 bar). At these settings, the sheet is no longer warped, but has a slight bow to the left. The back pressure is again adjusted to 40, 40, 50, 75, 80, 95 PSIG (1.8, 2.8, 3.4, 5.2, 5.5, 6.6 bar). The sheet straightness now falls within the required tolerance range, and no more adjustments are needed. Between each adjustment, 30' (9.1 m) of material is produced. This is due to the fact that the fixturing devices are 25' (7.6 m) long, and as the sheet produced under the new adjustments should extrude past the end of the fixture to assess its over all quality.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An apparatus for ram extruding an UHMWPE panel of uniform thickness with a width greater than 0.4 m, the apparatus comprising:
   a) a slit die having a top portion and a bottom portion defining a slit therebetween, a panel exit slit on an exit face thereof, and a ram entrance slit on an inlet face thereof, the slit having a width greater than 0.4 m, the width corresponding to the width of the UHMWPE panel;
   b) a UHMWPE powder supply passage communicating with the slit of the slit die proximate the entrance slit thereof and containing UHMWPE powder;
   c) a ram having a tongue shaped so as to enter the entrance slit of the slit die;
   d) a plurality of independently adjustable transverse cooling zones positioned across the width of both the top portion and bottom portion of the slit die proximate the exit slit thereof;
   e) at least one heating zone positioned between the entrance slit and the transverse cooling zones; and
   f) a back pressure device located downstream from the exit slit in the machine direction, which restrains movement of an extruded panel away from the slit die,
   wherein the apparatus is used for ram extrusion of UHMWPE.

2. The apparatus of claim 1, wherein the panel exit slit of the slit die does not have a substantially rectangular geometry as manufactured, but distorts to a substantially rectangular shape at ram extrusion pressure.

3. The apparatus of claim 1, further comprising upper and lower supports bearing respectively against the top and bottom portions of the slit die, restraining distortion of the slit die in a vertical direction.

4. The apparatus of claim 1, wherein said upper and lower support members extend beyond the die in a direction transverse to the machine direction, and are placed in tension by bolts between the upper and lower support members.

5. The apparatus of claim 4, wherein said bolts are multi-jackbolt tensioners.

6. The apparatus of claim 1, wherein said die has a vertical taper which constitutes a narrowing of the slit of the slit die in a vertical direction beginning at a point at or after a position of innermost penetration of the ram tongue into the entrance slit.

7. The apparatus of claim 6, wherein the vertical taper is less than a 10° included angle.

8. The apparatus of claim 7, wherein the taper is symmetrical on both top and bottom halves of the slit die.

9. The apparatus of claim 8, wherein the included angle of the taper is less than 5°.

10. The apparatus of claim 6, wherein said vertical taper comprises a continuous non-planar surface, a plurality of contiguous planar surfaces at varying angles to a plane parallel to the machine direction, or a combination thereof, wherein imaginary planes extending from the beginning of the taper to the end of the taper have an included angle of less than 10°.

11. The apparatus of claim 1, wherein the die slit has a horizontal contour such that the top surface of the exit slit and bottom surface of the exit slit are not planar as manufactured.

12. The apparatus of claim 11, wherein the height of the slit of the slit die in a central portion thereof is less than an edge portion thereof.

13. The apparatus of claim 11, wherein the contour of the top portion of the slit die which defines the slit and the bottom portion of the slit die which defines the slit, proximate the exit face of the slit die, have minimally two symmetrical edge contours on opposing sides in the direction of the width slit and a central contour, the shape of the edge contours being different from the shape of the central contour.

14. The apparatus of claim 13, wherein the central contour is planar and parallel with a line drawn through the center of the exit slit in a transverse direction, and the edge portions are surfaces, optionally planar, which taper in a horizontal direction such that the height of the slit narrows from a position proximate the outside edge of the slit towards the center of the slit.

15. The apparatus of claim 13, wherein the top portion of the slit die which defines the slit is a non-planar surface having a shape such that the height of the slit of the die is less at the center of the die than at an edge portion.

16. The apparatus of claim 15, wherein the contour of the top portion of the slit die defining the slit, transverse to the machine direction has the geometry of a conic section.

17. The apparatus of claim 13, wherein the edge contours are planar or a conic section transverse to the machine direction, at an average included angle of less than 0.5° from horizontal, and at least one central contour is a conic section transverse to the machine direction.

18. The apparatus of claim 17, wherein the shape of the central contour is selected from the group consisting of circles, parabolae, hyperbolae, oblate ellipses, and prolate ellipses.

19. The apparatus of claim 13, having a plurality of central contours symmetrically positioned with respect to a centerline of the slit.

20. The apparatus of claim 1, wherein the slit of the slit die has a lubricious and/or wear resistant coating thereon.

21. The apparatus of claim 1, having minimally three transverse cooling zones along each of the top portion of the slit die and the bottom portion of the slit die.

22. The apparatus of claim 1, having minimally five transverse cooling zones along the top portion of the slit die.

23. The apparatus of claim 1, having from two to ten transverse cooling zones along the top portion of the slit die.

24. The apparatus of claim 1, having a plurality of cooling zone temperature sensors, each sensor associated with a respective cooling zone, and a corresponding plurality of proportional coolant control valves, the position of each proportional control valve governed by temperature sensed by a sensor such that temperatures of the individual cooling zones or groups of cooling zones are adjusted automatically to maintain a set point temperature for the individual cooling zones or groups of cooling zones.

25. The apparatus of claim 1, wherein said back pressure device comprises a plurality of independently adjustable back pressure elements positioned transverse to the machine direction.

26. The apparatus of claim 25, wherein said back pressure elements comprise a plurality of top platens positioned to bear against the top of an UHMWPE panel exiting the slit of the slit die, and at least one bottom member which supports said panel, such that pressure exerted on the back pressure elements will produce a frictional restraint on a moving panel.

27. The apparatus of claim 26, wherein said top platens comprise boards of wood, to which hydraulic or pneumatic pressure actuators are attached.

28. The apparatus of claim 26, wherein said plurality of top platens comprises minimally four platens.

29. The apparatus of claim 1, further comprising a vertical movement restraining apparatus, comprising a top restraint and a bottom restraint which bear against a panel exiting the slit of the slit die or which are spaced closely to the panel, such that the panel and portions thereof are restrained from any appreciable vertical movement.

30. The apparatus of claim 29, wherein the vertical movement restraining apparatus comprises a double band press.

31. The apparatus of claim 29, wherein the vertical movement restraining apparatus comprises a plurality of roll pairs, the roll pairs having a top roll which bears against the panel and a bottom roll which supports the panel.

32. The apparatus of claim 29, which further produces sliding frictional or rotational restraint relative to panel movement in the machine direction.

33. The apparatus of claim 1, further comprising at least two side guides, one side guide positioned to bear against an edge of a panel exiting the slit die and one side guide positioned to bear against an opposing side of the panel, and pressure actuators attached to each side guide such that the side guides are optionally pressed against the edge of the panel.

34. The apparatus of claim 33, wherein the side guides are positioned, along the machine direction, proximate the back pressure device.

35. An apparatus for ram extruding an UHMWPE panel of uniform thickness and a width greater than 0.4 m comprising:
   a) a slit die having a top portion and a bottom portion defining a slit therebetween, a panel exit slit on an exit face thereof, and a ram entrance slit on an inlet face thereof the width of the slit corresponding to the width of the UHMWPE panel;
   b) a UHMWPE powder supply passage communicating with the slit of the slit die proximate the entrance slit thereof;
   c) a ram having a tongue shaped so as to enter the entrance slit of the slit die;
   d) a plurality of independently adjustable transverse cooling zones positioned across the width of both the top portion and bottom portion of the slit die proximate the exit slit thereof;
   e) at least one heating zone positioned between the entrance slit and the transverse cooling zones;
   f) a back pressure device, located downstream from the panel exit slit in the machine direction, which restrains movement of an extruded panel away from the slit die;
   g) a vertical movement restraining apparatus downstream from the back pressure device; and
   h) pressurizable side guides positioned so as to bear against opposing edges of a panel exiting the slit die to maintain parallelism of the panel with respect to the machine direction.

* * * * *